United States Patent
Honsho et al.

(10) Patent No.: US 7,920,345 B2
(45) Date of Patent: *Apr. 5, 2011

(54) LENS BARREL SUPPORTING FRAME, LENS RETAINING STRUCTURE, LENS BARREL AND CAMERA

(75) Inventors: Hironori Honsho, Hyogo (JP); Tetsuya Uno, Osaka (JP); Keishi Iwasaki, Osaka (JP); Keiji Sakamoto, Osaka (JP); Hideyuki Hashi, Osaka (JP); Shinichi Iwasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,909

(22) Filed: Feb. 19, 2010

(65) Prior Publication Data

US 2010/0142939 A1    Jun. 10, 2010

Related U.S. Application Data

(63) Continuation of application No. 12/022,632, filed on Jan. 30, 2008, now Pat. No. 7,746,584.

(30) Foreign Application Priority Data

Jan. 30, 2007  (JP) ................................. 2007-019188

(51) Int. Cl.
*G02B 7/02* (2006.01)
*G02B 15/14* (2006.01)
(52) U.S. Cl. .................... 359/826; 359/819; 359/700
(58) Field of Classification Search .......... 359/694–704, 359/811–830
See application file for complete search history.

(56) References Cited

U.S. PATENT DOCUMENTS

| 5,699,200 | A  | * | 12/1997 | Uno et al. ..................... 359/700 |
| 6,195,212 | B1 |   | 2/2001  | Miyamoto ..................... 359/699 |
| 6,268,970 | B1 |   | 7/2001  | Ito et al. ........................ 359/826 |
| 7,471,473 | B2 | * | 12/2008 | Shintani ......................... 359/819 |
| 7,746,584 | B2 | * | 6/2010  | Honsho et al. ................ 359/826 |

(Continued)

FOREIGN PATENT DOCUMENTS

JP    7-191249    7/1995

(Continued)

OTHER PUBLICATIONS

United States Notice of Allowance issued in U.S. Appl. No. 12/022,632 dated Apr. 8, 2010.

*Primary Examiner* — Mohammed Hasan
(74) *Attorney, Agent, or Firm* — McDermott Will & Emery LLP

(57) ABSTRACT

Lens barrel 3 includes a stationary frame 20, a drive frame 30, a rotation cam frame 70, and a first lens frame 60. The drive frame 30 is supported by the stationary frame 20 to be movable in a Y axis direction along an optical axis of an imaging optical system O and rotatable around the optical axis in response to a drive force. The rotation cam frame 70 is supported by the drive frame 30 to be movable in the Y axis direction relative to the drive frame 30 in response to the drive force. The first lens frame 60 supports a first lens group G1 included in the imaging optical system O, and is supported by the rotation cam frame 70 to be movable in the Y axis direction relative to the rotation cam frame 70 in response to the drive force.

8 Claims, 17 Drawing Sheets

U.S. PATENT DOCUMENTS

| | | |
|---|---|---|
| 2006/0098975 A1 | 5/2006 | Kobayashi .................... 396/448 |
| 2007/0047951 A1 | 3/2007 | Tanaka et al. ................. 396/448 |
| 2007/0115566 A1 | 5/2007 | Miyazawa et al. ............ 359/811 |

FOREIGN PATENT DOCUMENTS

| | | |
|---|---|---|
| JP | 2002-131509 | 5/2002 |
| JP | 2002-277709 | 9/2002 |
| JP | 2002-350705 | 12/2002 |
| JP | 2003-066308 | 3/2003 |
| JP | 2005-215082 | 8/2005 |
| JP | 2005-234259 | 9/2005 |
| JP | 2006-39152 | 2/2006 |
| JP | 2006-133682 | 5/2006 |
| JP | 2007-101993 | 4/2007 |
| WO | WO 2006/011621 A1 | 2/2006 |

\* cited by examiner

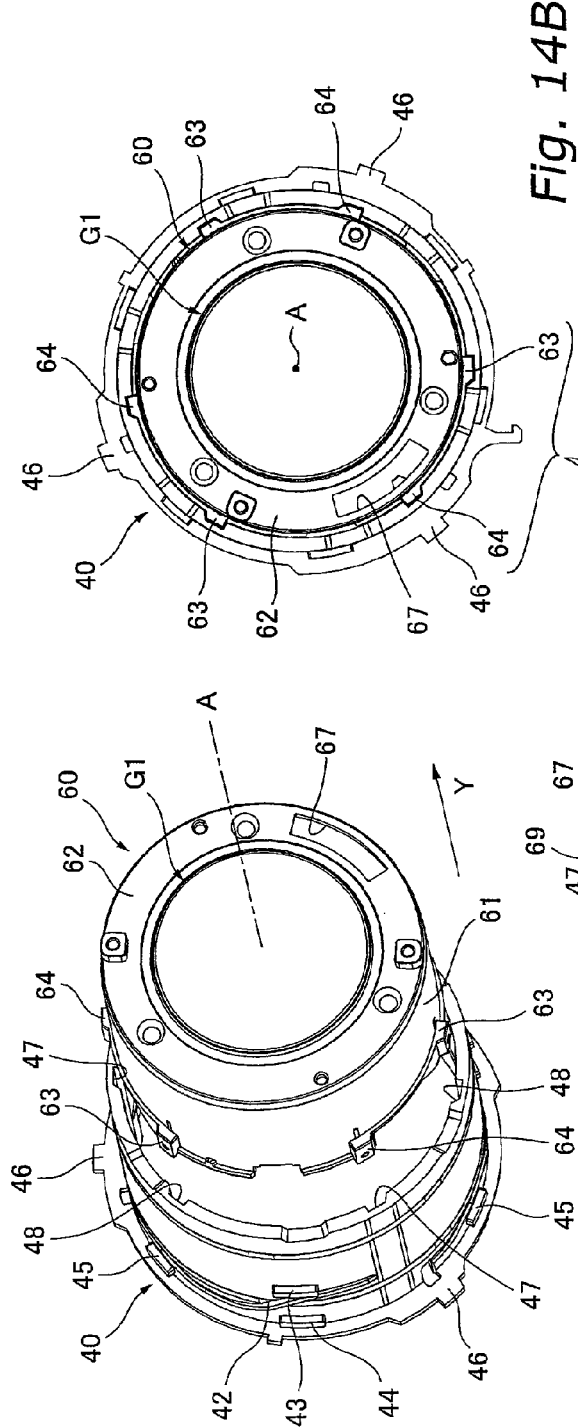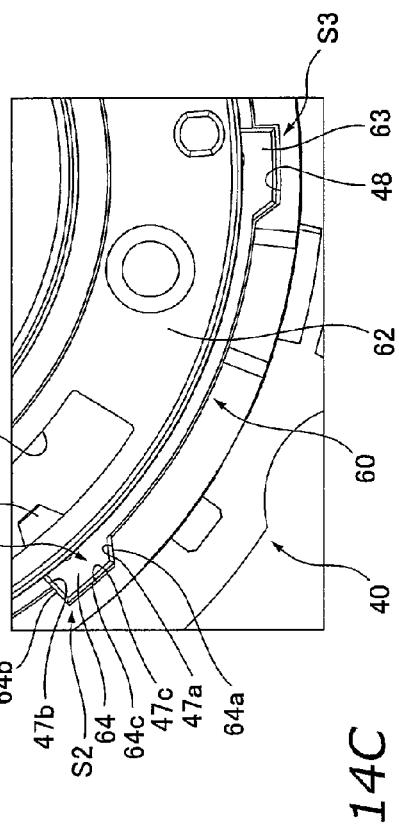
Fig. 14A
Fig. 14B
Fig. 14C

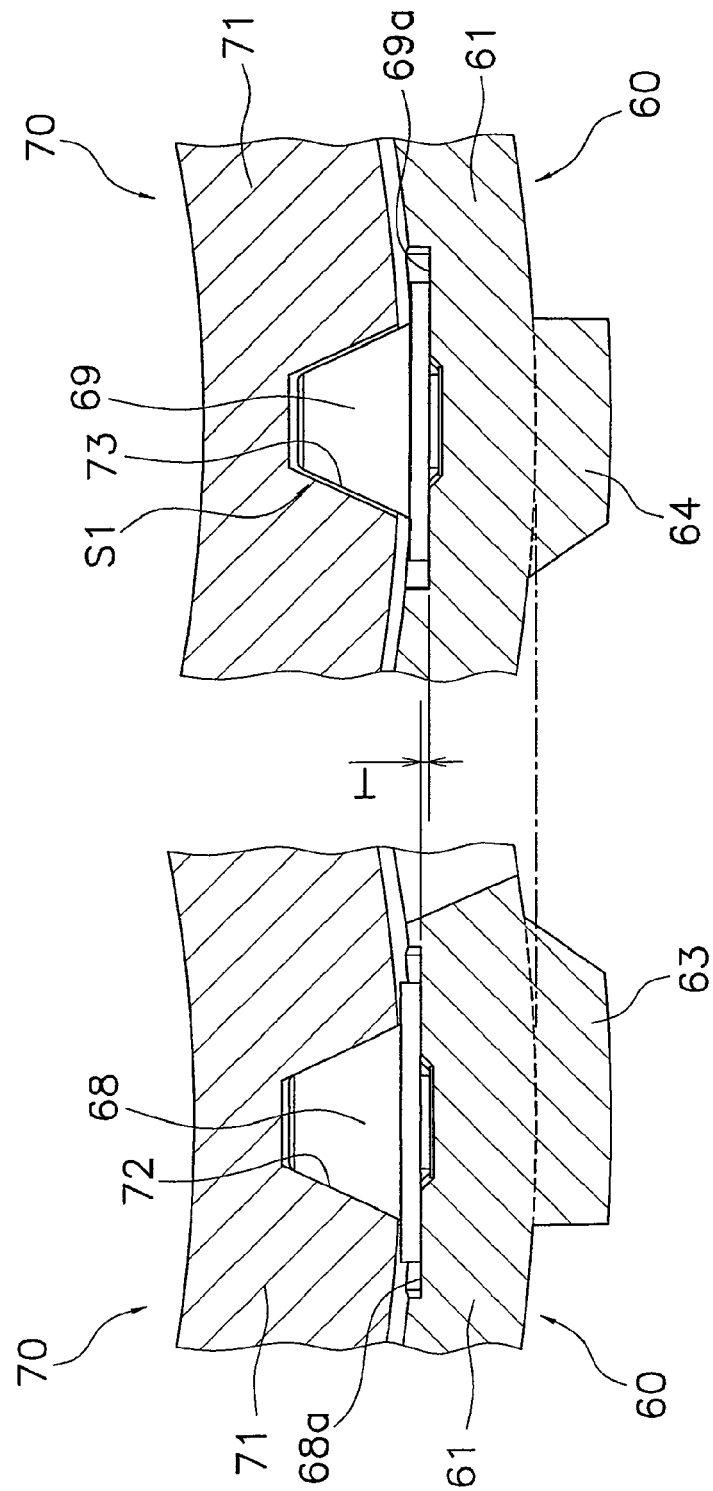

LENS BARREL SUPPORTING FRAME, LENS RETAINING STRUCTURE, LENS BARREL AND CAMERA

CROSS-REFERENCE TO RELATED APPLICATIONS

This application is a Continuation of U.S. application Ser. No. 12/022,632, filed on Jan. 30, 2008 now U.S. Pat. No. 7,746,584, claiming priority of Japanese Patent Application No. 2007-019188, filed on Jan. 30, 2007, the entire contents of each of which are hereby incorporated by reference.

BACKGROUND OF THE INVENTION

1. Field of the Invention

The present invention relates to a lens barrel supporting frame, a lens retaining structure, a lens barrel and a camera, and in particular, relates to a lens barrel having a plurality of supporting frames.

2. Description of the Related Art

Digital cameras that make use of image sensors such as a CCD (Charge Coupled Device) or CMOS (Complementary Metal-oxide Semiconductor) sensor to convert an optical image into an electrical signal, and record by digitizing the electrical signal, have grown to be popular in recent years.

With these digital cameras, there is a need not only for increasing the number of pixels of the CCD or CMOS sensor, but also for improving the performance of the lens barrel that forms the optical image on the image sensor. More specifically, there is a need for a lens barrel equipped with a high-power zoom lens system.

On the other hand, the body of digital cameras needs to be made more compact in order to improve the portability. To this end, the lens barrel is required to be miniaturized, which is thought to largely contribute to the miniaturization of the body.

Consequently, for example, as disclosed in Japanese Patent Laid-Open Publication Nos. JPH7-191249, JP2002-277709, JP2005-234259, and JP2006-133682, various lens barrels have been proposed before.

However, with a conventional lens barrel, further miniaturization is difficult.

For example, with the lens barrel disclosed in JPH7-191249, a first zoom frame 31 supporting a first lens group L1 which is closest to the subject is supported to be moveable in the direction along the optical axis by a stationary frame 34. In this case, in order to miniaturize the lens barrel, it is necessary to further reduce the sizes of the stationary frame 34 and the first zoom frame 31 in the direction along the optical axis.

In addition, with the lens barrel disclosed in JP2002-277709, a cam frame 15 is supported to be movable in the direction along the optical axis by a stationary frame 13. A first group movement frame 18 supporting the first lens group L1 is supported to be movable in the direction along the optical axis by the cam frame 15. In this case, in order to miniaturize the lens barrel, it is necessary to further reduce the sizes of stationary frame 13, the cam frame 15, and the first group movement frame 18 in the direction along the optical axis.

However, as FIG. 5 of JPH7-191249 and FIG. 5 of JP2002-277709 make clear, with both the lens barrels, it is difficult to further reduce the sizes of the members.

In addition, a lens barrier is disposed to cover the first lens group in a conventional lens barrel. Generally, a lens barrier is fixed to the first lens frame that retains the first lens group, and includes a barrier mechanism for protecting the first lens group, and an operating lever for switching the barrier mechanism open or close. It is possible to switch the barrier mechanism open or close by moving the operating lever in the rotational direction around the optical axis. A drive lever for driving the operating lever is disposed on a motionless member such as a master flange. When the lens barrier moves in the direction along the optical axis relative to the motionless member, the operating lever is driven by the drive lever in the rotational direction and the direction along the optical axis.

For example, with the lens barrel disclosed in JP2006-133682, when an engagement portion 7d of a barrier drive frame 7 and a stationary member 12 relatively move in the direction along the optical axis, a tapered surface of the engagement portion 7d and a sloped surface 12a of the stationary member 12 slide together. As a result, the barrier drive frame 7 and the stationary member 12 relatively move in the rotational direction, and opening and closing operation of a barrier 4 is switched.

However, since the lens barrier is a mechanism for covering the first lens group, the lens barrier is fixed to a tip portion of the first lens frame supporting the first lens group. Meanwhile, the master flange provided with the drive lever is disposed on the farthest position from the subject in the lens barrel. In other words, a plurality of supporting frames are generally disposed between the lens barrier and the master flange. Consequently, with the lens barrel disclosed in JP2006-133682, in order to drive the engagement portion 7d of the barrier drive frame 7 via the stationary member 12, for example, it is necessary to provide an opening through which the engagement portion 7d and the stationary member 12 pass in the direction along the optical axis in another supporting frame. As a result, the design freedom of each supporting frame deteriorates, and the miniaturization of the lens barrel is hindered.

In addition, with a conventional lens barrel, a cam portion causes the outside dimension of the cylindrical portion of the supporting frame to be larger. For example, with the lens barrel disclosed in JP2005-234259, three cam followers 17a are disposed on the outer periphery side of a lens frame 17. The cam followers 17a are inserted into a cam groove 13b formed on the inner periphery part of a drive tube 13. When the lens frame 17 rotates relative to the drive tube 13, the lens frame 17 moves relative to the drive tube 13 in a direction along the optical axis. At this time, since a load acts on the cam followers 17a, the portion on which the cam followers 17a are formed is thicker compared to the surroundings thereof in the lens frame 17, as shown in FIG. 1 of JP2005-234259. As a result, even if the surroundings is thinner, the outside dimension of the lens frame 17 becomes larger due to the portion on which the cam followers 17a are formed, and the miniaturization of the lens barrel is hindered.

In addition, in a conventional lens barrel, since three cam portions and three cam grooves are disposed at a constant pitch in the circumferential direction, the supporting frames may be attached in a wrong direction when fixing a supporting frame to another supporting frame. Such assembly performance deterioration causes the assembly time to increase, and sometimes causes the yield of the product to decrease. As a result, the manufacturing cost of the lens barrel increases.

Furthermore, in a conventional lens barrel, since a supporting frame is supported by three cam portions and three cam grooves, if an impact is applied to the lens barrel when a user drops the camera, the cam portions and the cam grooves may be damaged.

SUMMARY OF THE INVENTION

It is a first object of the present invention is to realize the miniaturization of a lens barrel.

It is a second object of the present invention is to reduce the manufacturing cost of a lens barrel.

It is a third object of the present invention is to improve the strength of a lens barrel.

A lens barrel according to a first aspect of the present invention is a lens barrel that supports an imaging optical system, and includes a stationary frame, a drive frame, a first cam frame, and a first lens frame. The drive frame is supported by the stationary frame to be rotatable around an optical axis of the imaging optical system and movable in the straight-movement direction along the optical axis in response to a drive force inputted in the rotational direction around the optical axis. The first cam frame is supported by the drive frame to be movable in the straight-movement direction relative to the drive frame in response to the drive force. The first lens frame supports a first lens group included in the imaging optical system, and is supported by the first cam frame to be movable in the straight-movement direction relative to the first cam frame in response to the drive force.

With this lens barrel, when the drive force is inputted to the drive frame, the drive frame rotates around the optical axis relative to the stationary frame. At this time, the drive frame moves in the straight-movement direction relative to the stationary frame. The first cam frame moves relative to the drive frame in the straight-movement direction. The first lens frame moves relative to the first cam frame in the straight-movement direction. The first lens frame moves in the straight-movement direction relative to the stationary frame in response to the drive frame and the first cam frame.

In this way, this lens barrel has more members that move the first lens frame in the straight-movement direction compared to a conventional lens barrel. Therefore, for example, when the stationary frame is taken as the standard, the displacement of the first lens frame in the straight-movement direction is the summation of the displacement of the drive frame in the straight-movement direction relative to the stationary frame, the displacement of the first cam frame in the straight-movement direction relative to the drive frame, and the displacement of the first lens frame in the straight-movement direction relative to the first cam frame. That is, the displacement of the first lens frame can be shared to the drive frame and the first cam frame. As a result, with this lens barrel, it is possible to reduce the sizes of each member in the direction along the optical axis, and miniaturization becomes possible.

The lens barrel according to a second aspect of the present invention is the lens barrel of the first aspect, wherein the first cam frame is supported by the drive frame to be movable in the straight-movement direction and rotatable integrally around the optical axis relative to the drive frame in response to the drive force.

Here, since the first cam frame rotates integrally with the drive frame, it is possible to realize the relative rotation of the first cam frame and the first lens frame without rotating the first lens frame relative to the stationary frame. As a result, with this lens barrel, it is possible to realize miniaturization while stabilizing the optical performance.

The lens barrel according to a third aspect of the present invention is the lens barrel of the first or the second aspect, wherein the first cam frame is disposed on the inner periphery side of the drive frame. The first lens frame is disposed on the outer periphery side of the first cam frame, on the inner periphery side of the drive frame.

In this case, since the first lens frame is disposed on the outer periphery side of the first cam frame, the larger diameter of the first lens frame can be used compared to the case that the first lens frame is disposed on the inner periphery side of the first cam frame. Furthermore, since the first lens frame is disposed on the outer periphery side of the first cam frame, the first lens frame can be also used as the outer frame that is necessary to be provided on the outside of the first cam frame. As a result, the design freedom of the imaging optical system improves, and the miniaturization of the lens barrel can be realized.

In addition, since the stationary frame, the drive frame, and the first lens frame are exposed outside, gaps formed between the stationary frame, the drive frame, and the first lens frame are also exposed outside.

However, since the first cam frame is disposed on the inner periphery side of the first lens frame, the first cam frame is not exposed outside. Therefore, the number of the gaps exposed outside reduces, compared to the case that the first lens frame is disposed on the inner periphery side of the first cam frame. Therefore, with this lens barrel, it is possible to prevent the optical performance from deteriorating.

The lens barrel according to a fourth aspect of the present invention is the lens barrel of any one of the first to the third aspects, further including a second cam frame. The second cam frame is supported by the stationary frame to be movable in the straight-movement direction and to be nonrotatable around the optical axis relative to the stationary frame, and supported by the drive frame to move integrally in the straight-movement direction and to be rotatable around the optical axis relative to the drive frame. The first cam frame includes a plurality of cam pins on the outer periphery part thereof. The drive frame includes a plurality of straight-movement grooves extending in the straight-movement direction and guiding the cam pins. The second cam frame includes a plurality of penetration cam grooves through which the cam pins pass.

In this case, when the drive frame rotates relative to the stationary frame, the drive frame and the first cam frame rotate integrally, and the first cam frame and the second cam frame relatively rotate. Therefore, the first cam frame moves in the straight-movement direction without rotating relative to the drive frame in accordance with the shape of the penetration cam grooves. As a result, it is possible to realize the mechanism that moves the first cam frame in the straight-movement direction relative to the drive frame with a simple structure.

The lens barrel according to a fifth aspect of the present invention is the lens barrel of any one of the first to the fourth aspects, further including a second lens frame. The second lens frame is supported by the first cam frame to be movable in the straight-movement direction relative to the first cam frame in response to the drive force, and supports a second lens group included in the imaging optical system. The second lens frame is disposed on the inner periphery side of the first cam frame.

The lens barrel according to a sixth aspect of the present invention is the lens barrel of the fifth aspect, further including a third lens frame. The third lens frame is supported by the first cam frame to be movable in the straight-movement direction relative to the first cam frame in response to the drive force, and supports a third lens group included in the imaging optical system. The third lens frame is disposed on the inner periphery side of the first cam frame. The second lens frame is disposed between the first lens frame and third lens frame in the straight-movement direction.

The lens barrel according to a seventh aspect of the present invention is a lens barrel that supports an imaging optical system, and includes a first frame, a second frame, and a lens barrier. The second frame is supported by the first frame to be movable in a straight-movement direction along the optical axis and rotatable around the optical axis of the imaging optical system relative to the first frame, and supports a lens group included in the imaging optical system. The lens barrier is fixed on the second frame to protect the lens group. The lens barrier includes a barrier mechanism to open the lens group to the outside and blocking the lens group from the outside, and an operating lever to switch the barrier mechanism between opening the lens group to the outside and blocking the lens group from the outside, by moving in a rotational direction around the optical axis. The first frame includes a substantially cylindrical first frame body, and a drive lever protruding in an axis direction from the first frame body and that is contactable with the operating lever in the rotational direction.

With this lens barrel, since the lens barrier is rotatable around the optical axis and movable in the straight-movement direction relative to the first frame, the drive lever of the first frame can press the operating lever of the lens barrier in the rotational direction.

In this case, the second frame is supported by the first frame, and the lens barrier is fixed to the second frame. Therefore, it becomes easier to arrange the operating lever of the lens barrier and the drive lever of the first frame close together, and another supporting frame will not be easier to be affected by the restrictions in the design by the operating lever and the drive lever than in the past. In other words, with this lens barrel, it is possible to realize miniaturization.

Furthermore, for example, while the drive lever of the first frame moves in the straight-movement direction with rotating around the optical axis, the operating lever of the lens barrier is pressed by the drive lever in the rotational direction. As a result, it is possible to obtain the amount of rotation that is necessary for opening and closing of the lens barrier, out of the limited amount of rotation of the second frame, and it is possible to realize miniaturization.

The lens barrel according to an eighth aspect of the present invention is the lens barrel of the seventh aspect, wherein the operating lever is movable between an opened position in which the barrier mechanism opens the lens group to the outside, and a closed position in which the barrier mechanism blocks the lens group from the outside. The drive lever drives the operating lever from the opened position to the closed position, or from the closed position to the opened position, by the relative movement in the direction along the optical axis and the relative rotation around the optical axis of the first frame and second frame.

The lens barrel according to a ninth aspect of the present invention is the lens barrel of the seventh or the eighth aspect, wherein the first frame includes a recess formed on the first frame body, in which the operating lever is accommodated in a direction along the optical axis.

In this case, even if the operating lever comes close to the first frame, the operating lever is accommodated in the recess of the first frame. Therefore, it is possible to reduce the dimension of the lens barrel in the direction along the optical axis, in a state in which the first frame and the second frame are retracted the most in the direction along the optical axis. As a result, it is possible to realize miniaturization with this lens barrel.

The lens barrel according to a tenth aspect of the present invention is the lens barrel of any one of the seventh to the ninth aspects, wherein the second frame includes a circular flange portion and an opening portion. The lens group is fixed to the flange portion. The flange portion is provided with the opening portion through which at least one of the operating lever and drive lever pass in an axis direction.

The lens barrel according to an eleventh aspect of the present invention is the lens barrel of any one of the seventh to the tenth aspects, wherein the first frame includes a plurality of first cam grooves formed on the first frame body. The second frame includes a substantially cylindrical second frame body, and a plurality of first cam pins protruding in the radial direction from the second frame body and guided by the first cam grooves. The first cam grooves include groove bodies guiding the first cam pins, and step portions provided in the groove bodies, with which the first cam pins are contactable in the rotational direction and over which the first cam pins are able to cross by acting a predetermined load in the rotational direction.

When attaching the first frame and the second frame, the first cam pins of the first frame are inserted in the first cam grooves of the second frame. At this time, when the predetermined load is added to the second frame, the first cam pins cross over the step portions provided in the first cam grooves. That is, a lock mechanism of the first frame and the second frame is realized by the step portions and the cam pins. Since the first frame and the second frame are locked in the state in which the operating lever of the lens barrier and the drive lever of the first frame are in contact in the rotational direction, the first frame, the second frame, and the lens barrier can be treated as one assembly. As a result, with this lens barrel, the assembly performance improves, and it is possible to reduce the manufacturing cost.

The lens barrel according to a twelfth aspect of the present invention is the lens barrel of the eleventh aspect, wherein the first frame includes a plurality of second cam grooves formed in the first frame body and disposed between the plurality of cam grooves in the circumferential direction. The second frame includes a plurality of second cam pins protruding from the second frame body in the radial direction and inserted in the second cam grooves. The second frame is positioned by the second cam grooves and second cam pins relative to the first frame in the radial direction and straight-movement direction.

In this case, not the second cam pins for positioning, but the first cam pins are used as pins for the lock mechanism. This allows to realize the lock mechanism without deteriorating the positioning accuracy.

The lens barrel according to a thirteenth aspect of the present invention is the lens barrel of the twelfth aspect, wherein the second cam pins are disposed on different positions from the first cam pins in the radial direction.

A lens barrel supporting frame according to a fourteenth aspect of the present invention is a supporting frame used in a lens barrel that supports an imaging optical system, and includes a substantially cylindrical supporting frame body, at least one first cam portion, and at least one second cam portion. The first cam portion is provided on either the inner periphery part or the outer periphery part of the supporting frame body, and protrudes in the radial direction. The second cam portion is provided on the other side of either the inner periphery part or the outer periphery part of the supporting frame body, and protrudes in the radial direction. The second cam portion is disposed on the opposite side from the first cam portion in the radial direction relative to the supporting frame body.

With this supporting frame, since the second cam portion is disposed on the opposite side from the first cam portion in the radial direction, the thicker portion to be used for the first cam portion can be used as the second cam portion. In this case, the second cam portion is inserted inside a cam groove of another supporting frame. Therefore, the second cam portion does not affect the outer shape of the supporting frame body. This allows the supporting frame to be miniaturized in the radial direction, and it is possible to realize miniaturization of the lens barrel.

The lens barrel supporting frame according to a fifteenth aspect of the present invention is the supporting frame of the fourteenth aspect, wherein a plurality of the first cam portions are disposed at an irregular pitch in the circumferential direction.

In this case, when attaching the supporting frame to another supporting frame, the supporting frame is prevented from being attached in the wrong direction, and the assembly performance improves.

The lens barrel supporting frame according to a sixteenth aspect of the present invention is the supporting frame of the fourteenth or the fifteenth aspect, wherein a plurality of the second cam portions are disposed at an irregular pitch in the circumferential direction. In this case, when attaching the supporting frame to another supporting frame, the supporting frame is prevented from being attached in the wrong direction, and the assembly performance improves.

The lens barrel supporting frame according to a seventeenth aspect of the present invention is the supporting frame of any one of the fourteenth to the sixteenth aspects, wherein the first cam portion is formed integrally with the supporting frame body. The second cam portion is a separate member from the supporting frame body, and is fixed to the supporting frame body.

For instance, a supporting frame used in a lens barrel is generally manufactured by injection molding. In this case, since the second cam portion is the separate member from the supporting frame body, it becomes easier to remove the molded product from the metal mold, and the productivity improves when the injection molding.

A lens barrel supporting frame according to an eighteenth aspect of the present invention is a supporting frame used in a lens barrel supporting an imaging optical system, and includes a substantially cylindrical supporting frame body and a plurality of first cam portions. The first cam portions are provided on either the inner periphery side or the outer periphery side of the supporting frame body, and protrude in the radial direction. The first cam portions are disposed at an irregular pitch in the circumferential direction.

In this supporting frame, since the first cam portions are disposed at an irregular pitch, when attaching this supporting frame to another supporting frame, the supporting frame is prevented from being attached in the wrong direction, and the assembly performance improves. As a result, the manufacturing cost can be reduced.

The lens barrel supporting frame according to a nineteenth aspect of the present invention is the supporting frame of the eighteenth aspect, wherein the plurality of first cam portions include a first set in which the first cam portions are disposed at a constant pitch in the circumferential direction, and a second set in which the first cam portions are disposed at a constant pitch in the circumferential direction. A first cam portion included in the first set is disposed between two first cam portions included in the second set in the circumferential direction, and disposed at a position closer to one of the two second cam portions than the other thereof.

The lens barrel supporting frame according to a twentieth aspect of the present invention is the supporting frame of the nineteenth aspect, wherein the first cam portions included in the first set are disposed at different positions in the radial direction from the first cam portions included in the second set.

With this supporting frame, it is possible to make the fitting depth of the cam portions of either the first cam portions or the second cam portions shallower, if the opposing cam grooves of the first cam portions and the second cam portions have the saengageape. In other words, one set of the cam portions can be used for positioning, and the other set of the cam portions can be used for strengthening. This allows the impact acting on the supporting frame when the camera is dropped to be dispersed to the first cam portions and the second cam portions, and this prevents the first cam portions used for positioning from being damaged. In other words, the strength of the lens barrel can be improved.

A lens barrel supporting frame according to a twenty first aspect of the present invention is a supporting frame used in a lens barrel to support an imaging optical system, and includes a substantially cylindrical supporting frame body, a plurality of penetration cam grooves, a plurality of first protrusions, and a plurality of second protrusions. The penetration cam grooves are provided in the supporting frame body. The first protrusions are provided side by side in the circumferential direction on at least one of the inner periphery side and the outer periphery side of the supporting frame body, and protrude in the radial direction. The second protrusions are disposed side by side in the circumferential direction on at least one of the inner periphery side and the outer periphery side of the supporting frame body, and protrude in the radial direction. The first protrusions are disposed at different positions from the second protrusions in a direction along an optical axis of the imaging optical system. The penetration cam grooves are disposed between the first protrusions and second protrusions in the direction along the optical axis.

With this supporting frame, since the penetration cam grooves are disposed between the first protrusions and the second protrusions, the strength of the area around the penetration cam grooves of the supporting frame increases, and the strength of the lens barrel can be improved.

The lens barrel supporting frame according to a twenty second aspect of the present invention is the supporting frame of the twenty first aspect, wherein the penetration cam groove includes an actuation position corresponding to an actuation state of the lens barrel. The second protrusions are disposed on a first axial side of the actuation position.

In general, a user is likely to drop a camera in the state that the camera is ON (actuation state). In the actuation state of the camera, the lens barrel extends in a direction along the optical axis, and protrudes from the camera body. Therefore, the lens barrel can be easily damaged due to an impact acting thereto when the camera is dropped. In particular, the portions corresponding to the actuation state in the penetration cam grooves of the supporting frame are more likely to be damaged or deformed.

With this supporting frame, however, the second protrusions are disposed on a first axial side of the actuation position. In other words, a thicker portion of the supporting frame is provided around the actuation position of the penetration cam grooves. Consequently, the strength around the actuation position of the penetration cam grooves increases, and the strength of the lens barrel can be improved.

Here, the actuation position means, for example, a portion corresponding to the actuation state of the camera in the penetration cam grooves. Examples of the actuation position include a portion in which the penetration cam groove supports the cam portion in the actuation state of the camera.

The lens barrel supporting frame according to a twenty third aspect of the present invention is the supporting frame of the twenty first or the twenty second aspect, wherein the penetration cam grooves include a wide angle position corresponding to a wide angle end of the imaging optical system.

At least a part of the second protrusion overlaps with the wide angle position in an axis direction.

Since the actuation position of the lens barrel is generally set at the wide angle position of the imaging optical system, the strength of the area around the wide angle position at which the camera is likely to be dropped can be improved.

The lens barrel supporting frame according to a twenty fourth aspect of the present invention is the supporting frame of the twenty first or the twenty second aspect, further including a plurality of third protrusions. The third protrusions are provided side by side in the circumferential direction on at least one of the inner periphery side and the outer periphery side of the supporting frame body, and protrude in the radial direction. The penetration cam grooves include a wide angle position corresponding to a wide angle end of the imaging optical system. The wide angle position is disposed between the second protrusion and the third protrusion in the circumferential direction.

In the penetration cam grooves, the wide angle position protrudes toward first side or second side in the axis direction. In this case, since the second protrusions and the third protrusions are not disposed on the first side or the second side in the axis direction of the wide angle position, it is possible to reduce the dimension of the supporting frame in the axis direction, while improving the strength of the area around the penetration cam grooves.

Here, the wide angle position means, for example, a portion corresponding to a state in which the zoom magnification of the imaging optical system is the lowest (wide angle end) in the penetration cam grooves. Examples of the wide angle position include a portion in which the penetration cam groove supports the cam portion on the wide angle end of the imaging optical system.

The lens barrel supporting frame according to a twenty fifth aspect of the present invention is the supporting frame of the twenty fourth aspect, wherein the third protrusions are disposed at the same axial position as the second protrusions.

In this case, since the second protrusions and the third protrusions can be inserted in one rotation groove formed on another supporting frame, more grooves are not necessary to be formed on another supporting frame.

The lens barrel supporting frame according to a twenty sixth aspect of the present invention is the supporting frame of the twenty fourth or the twenty fifth aspect, wherein the penetration cam grooves include a photographing region and a retracting region. The photographing region is a region to which zoom operation of the lens barrel when photographing corresponds. The retracting region is a region to which retracting operation of the lens barrel corresponds. The second protrusions are disposed on a first axial side of the photographing region. The third protrusions are disposed on the first axial side of the retracting region.

In this case, the areas around the retracting region and the photographing region of the penetration cam grooves can be strengthened by the second protrusions and the third protrusions.

Here, the photographing region means, for example, a region in which the penetration cam groove supports the cam portion during the zoom operation of the lens barrel. The retracting region means, for example, a region in which the penetration cam groove supports the cam portion during the retraction operation of the lens barrel.

The lens barrel supporting frame according to a twenty seventh aspect of the present invention is the supporting frame of the twenty sixth aspect, wherein the retracting region includes a first retracting region, a second retracting region disposed on a first axial side compared to the first retracting region, and a third retracting region disposed on a second axial side compared to the second retracting region. The third protrusions are disposed on the first axial side of the second retracting region.

In this case, a portion in which the third protrusions are disposed is the portion in which the second retracting regions are disposed on the other side. That is, the space on which the third protrusions are disposed is secured by the second retracting regions. Therefore, it is possible to improve the strength of the supporting frame while reducing the size of the supporting frame in the axis direction.

The lens barrel supporting frame according to a twenty eighth aspect of the present invention is the supporting frame of any one of the twenty fifth to the twenty seventh aspects, wherein the axial dimensions of the second protrusions and third protrusions are smaller than the axial dimension of the first protrusions.

In this case, if the opposing cam grooves of the first to the third protrusions have the same shapes, the supporting frame is positioned by the first protrusions, and gaps are secured between the groove and the second protrusions and between the groove and the third protrusions. Therefore, in addition to the first protrusions used for positioning, it is possible to use the second protrusions and the third protrusions for strengthening purpose. This allows the impact acting on the supporting frame when the camera is dropped to be dispersed to the first through third protrusions, and this prevents the first through third protrusions from being damaged.

The lens barrel supporting frame according to a twenty ninth aspect of the present invention is the supporting frame of any one of the twenty first to the twenty eighth aspects, wherein the first protrusions are disposed at the same positions as the second protrusions in the circumferential direction.

With this supporting frame, the first and second protrusions can be introduced to rotation grooves by a common introduction groove.

A lens retaining structure according to a thirtieth aspect of the present invention includes a first lens, a second lens cemented to the first lens, and a retaining member supporting the first and the second lenses. The retaining member has a first portion that positions the first lens in a direction along an optical axis, and a second portion that positions an outer periphery portion of the second lens in a direction perpendicular to the optical axis. An outer portion of the first lens has a flat surface perpendicular to the optical axis. The first portion is in contact with the flat surface.

With this lens retaining structure, the second lens positions the first lens in the direction perpendicular to the optical axis, and the first lens positions the second lens in the direction along the optical axis. Therefore, the distance between the first and the second lenses can be shortened in a state that the first and the second lenses are cemented, and miniaturization can be realized.

The lens retaining structure according to a thirty first aspect of the present invention is the lens retaining structure of the thirtieth aspect, wherein the first lens includes a lens surface having a non-spherical shape. The flat surface is formed on the outer periphery portion of the lens surface.

The lens retaining structure according to a thirty second aspect of the present invention is the lens retaining structure of the thirtieth or the thirty first aspect, wherein the outer diameter of the first lens is smaller than the outer diameter of the second lens.

The lens retaining structure according to a thirty third aspect of the present invention is the lens retaining structure of the thirty first or the thirty second aspect, further including an adjustment lens disposed to be opposite to the lens surface across the first portion and fixed to the retaining member. The retaining member is disposed on the outer periphery side of the adjustment lens, and has a third portion having an inner diameter greater than the outer diameter of the adjustment lens.

A lens barrel according to a thirty fourth aspect of the present invention is a lens barrel for supporting an imaging optical system, and includes the supporting frame according to any one of the fourteenth to the twenty ninth aspects, or the lens retaining structure according to any one of the thirtieth to the thirty third aspects.

The lens barrel according to a thirty fifth aspect of the present invention includes the lens barrel according to any one of the first to the thirteenth aspects, an imaging optical system supported by the lens barrel, an image capturing unit that captures an optical image of a subject formed by the imaging optical system, and an outer case supporting the lens barrel.

Since this camera includes the lens barrel according to any one of the first to the thirteenth aspects, miniaturization, reduction of the manufacturing cost, or improvement in the strength can be realized.

A camera according to a thirty sixth aspect of the present invention includes the lens barrel according to the thirty fourth aspect, an imaging optical system supported by the lens barrel, an image capturing unit that captures an optical image of a subject formed by the imaging optical system, and an outer case supporting the lens barrel.

Since this camera includes the lens barrel according to the thirty fourth aspect, miniaturization, reduction of the manufacturing cost, or improvement in the strength can be realized.

In addition, "substantially cylindrical" mentioned above encompasses a case in which a member is approximately cylindrical, as well as a case in which a member is completely cylindrical. Therefore, "substantially cylindrical" encompasses the case in which a portion having another shape is added to a cylindrical member, for example.

BRIEF DESCRIPTION OF THE DRAWINGS

Referring now to the attached drawings which form a part of this original disclosure:

FIGS. 14A, 14B, and 14C are relationship diagrams of the first lens frame and a camera cam frame;
FIGS. 15A and 15B are detail views of areas around a first cam pin and a second cam pin;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The lens barrel and camera according to the present invention will now be described with reference to the drawings.

1. Overview of Digital Camera

Figure 1:
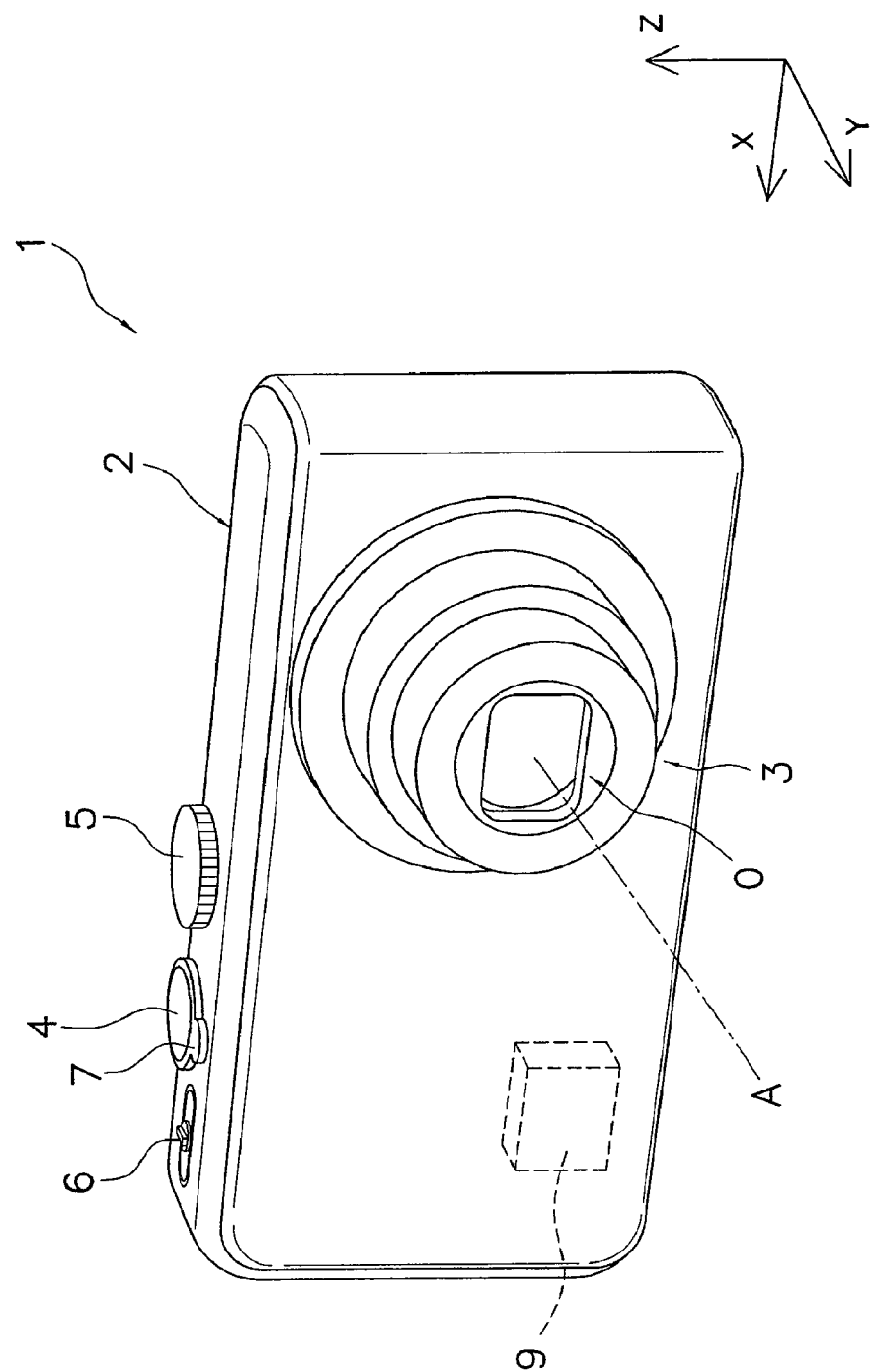
FIG. 1 is a schematic perspective view of a digital camera.
Figure 2:
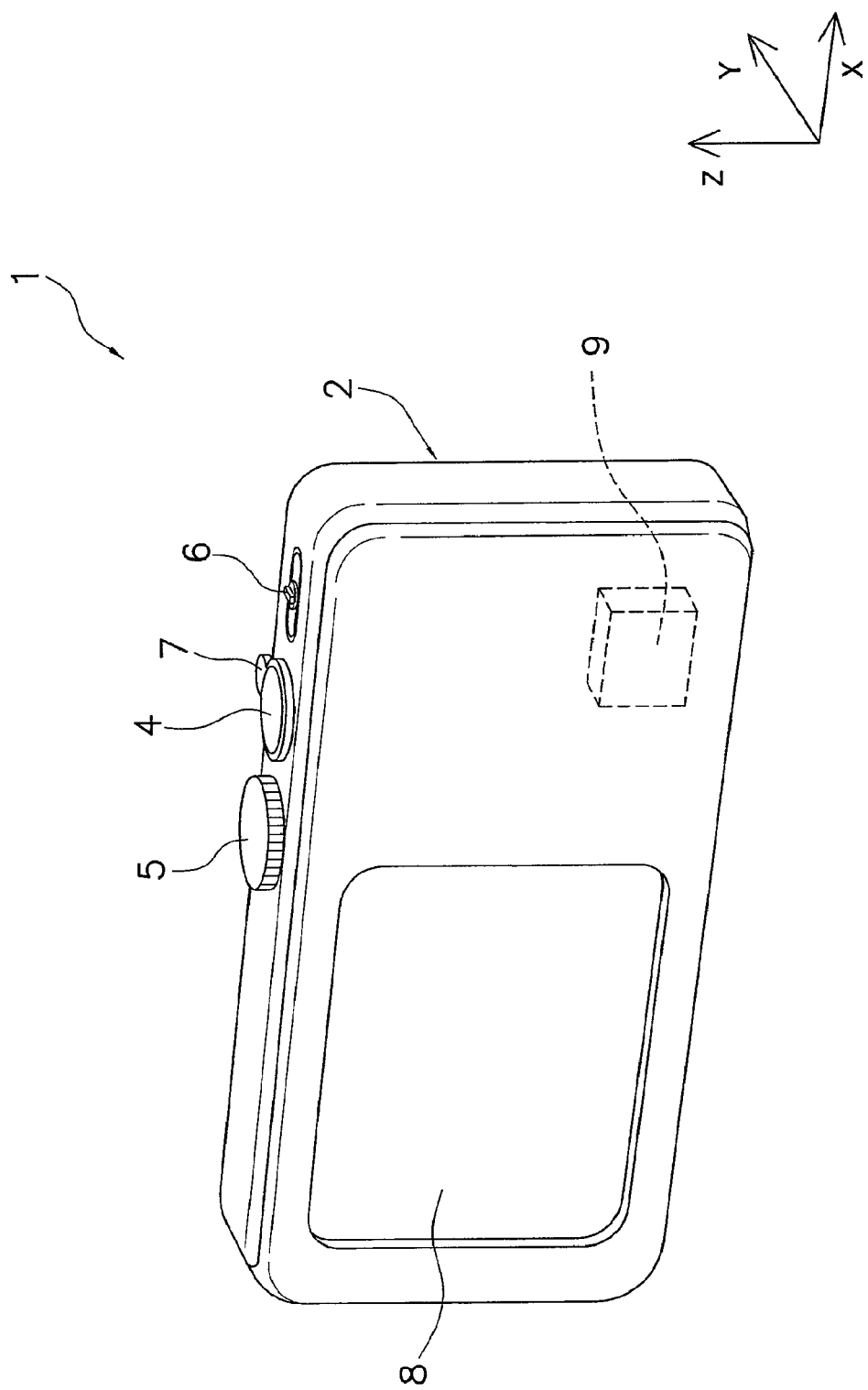
FIG. 2 is a schematic perspective view of a digital camera.

A digital camera 1 according to a preferred embodiment of the present invention will be described with reference to FIGS. 1 and 2. FIGS. 1 and 2 are schematic perspective views of the digital camera 1. FIG. 1 shows the situation when a lens barrel 3 is in an image capture state.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Configuration of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an image capturing unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of the Imaging Optical System and the Lens Barrel

Figure 3B:
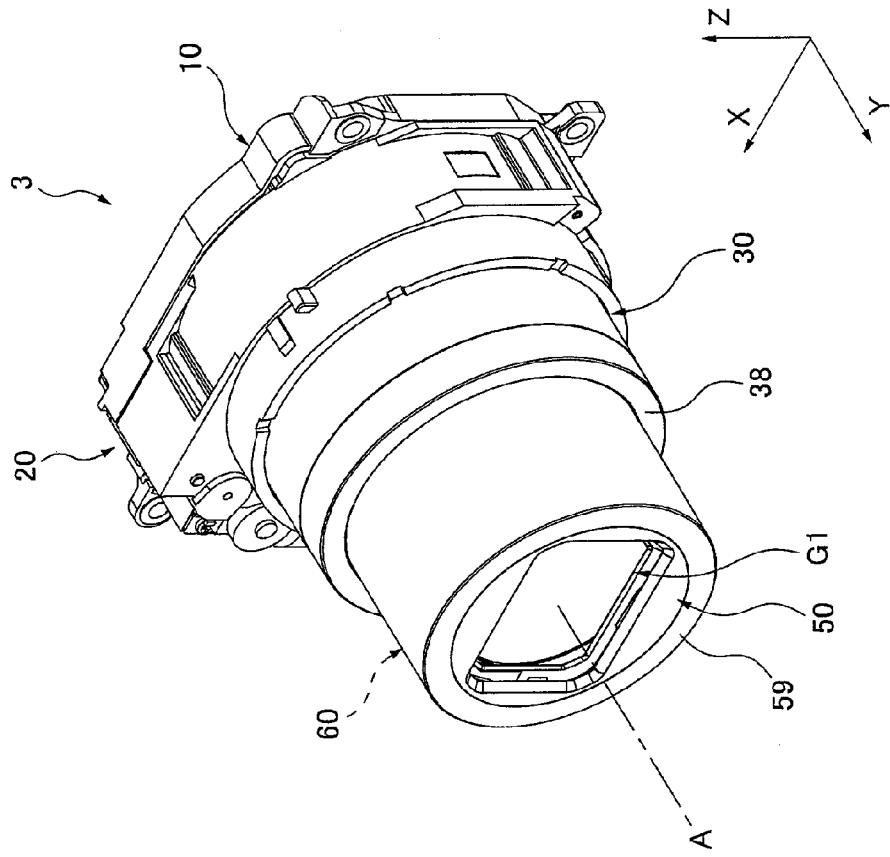
FIGS. 3A and 3B are schematic perspective views of a lens barrel.
Figure 3A:
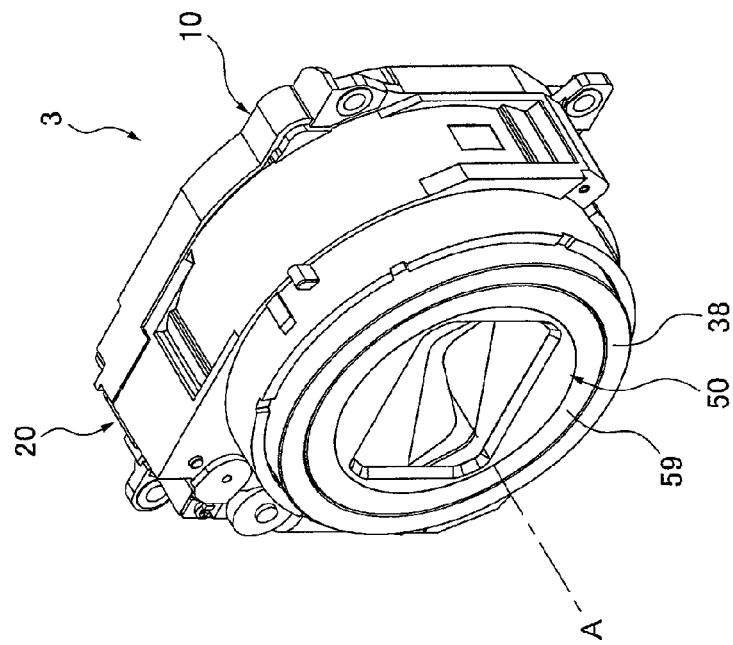
Figure 4:
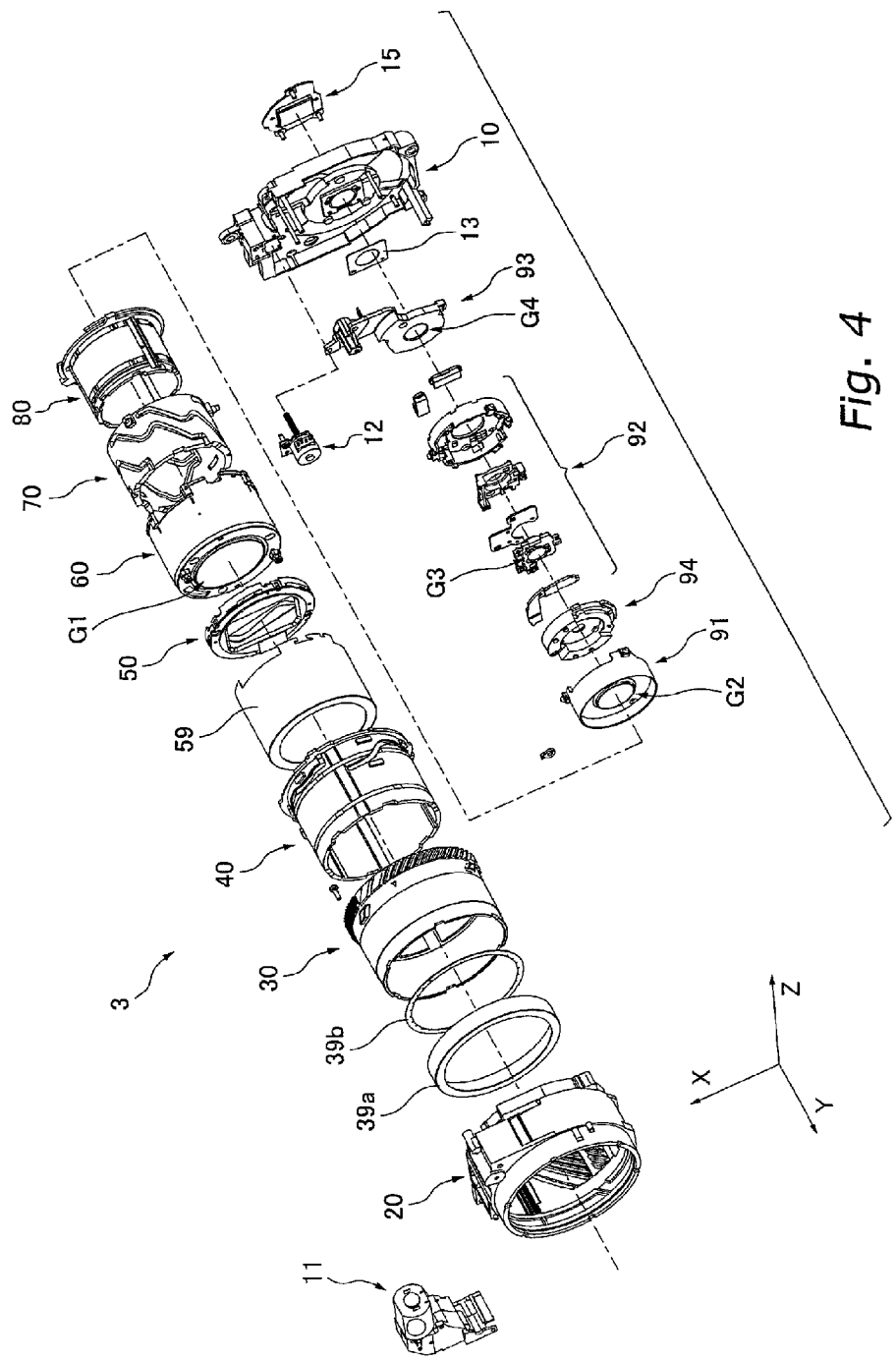
FIG. 4 is an exploded perspective view of a lens barrel.
Figure 6:
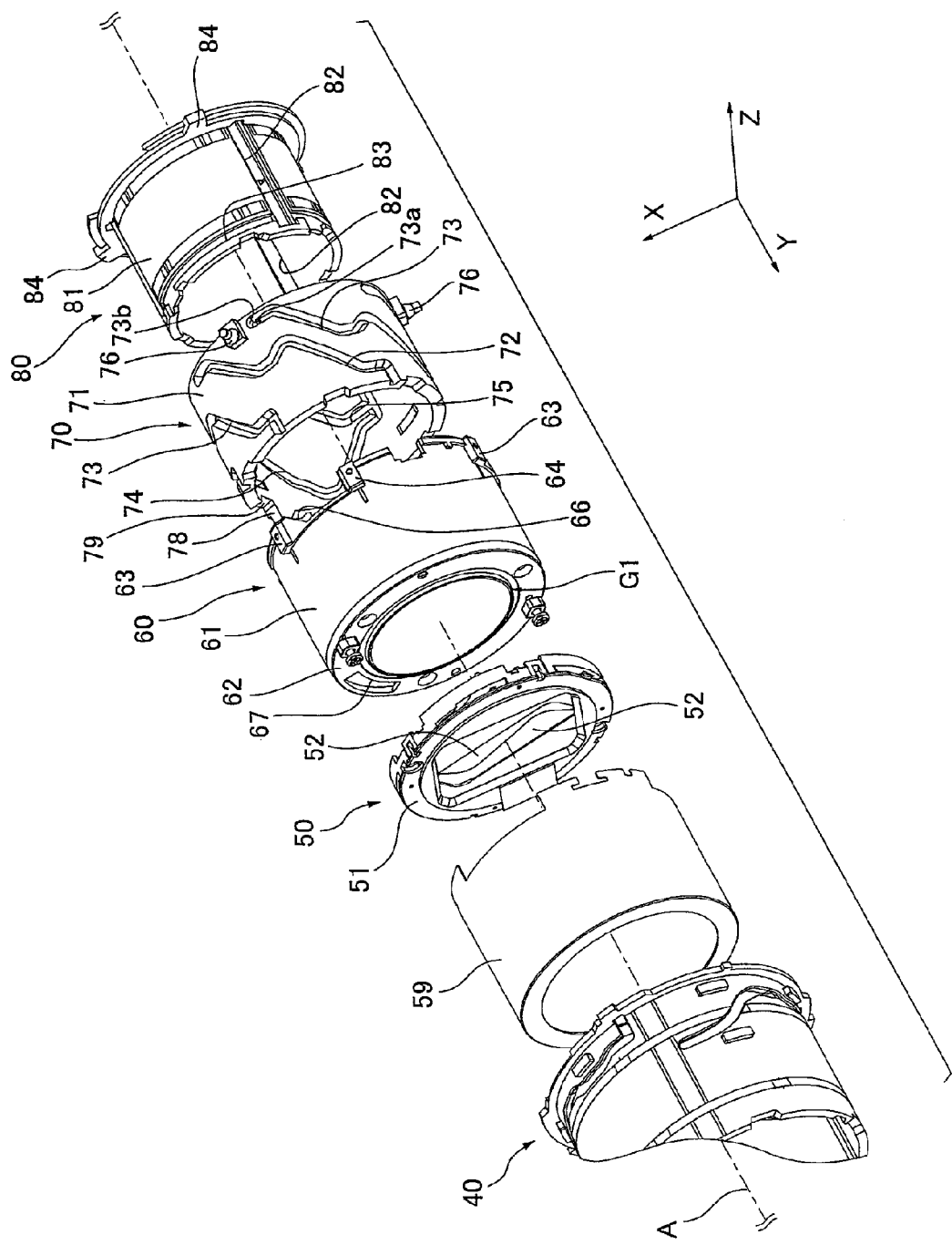
FIG. 6 is an exploded perspective view of a lens barrel.
Figure 7:
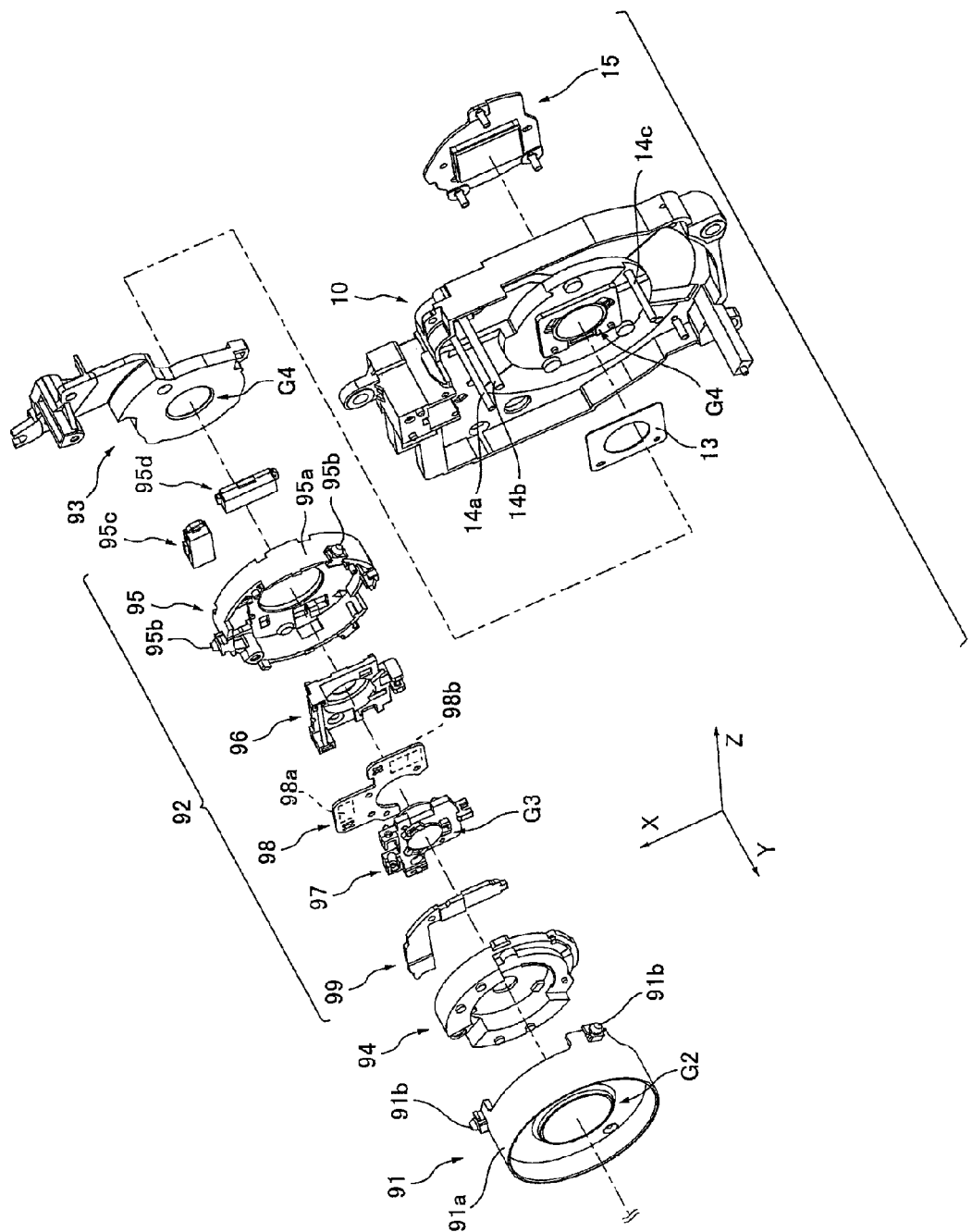
FIG. 7 is an exploded perspective view of a lens barrel.
Figure 8:
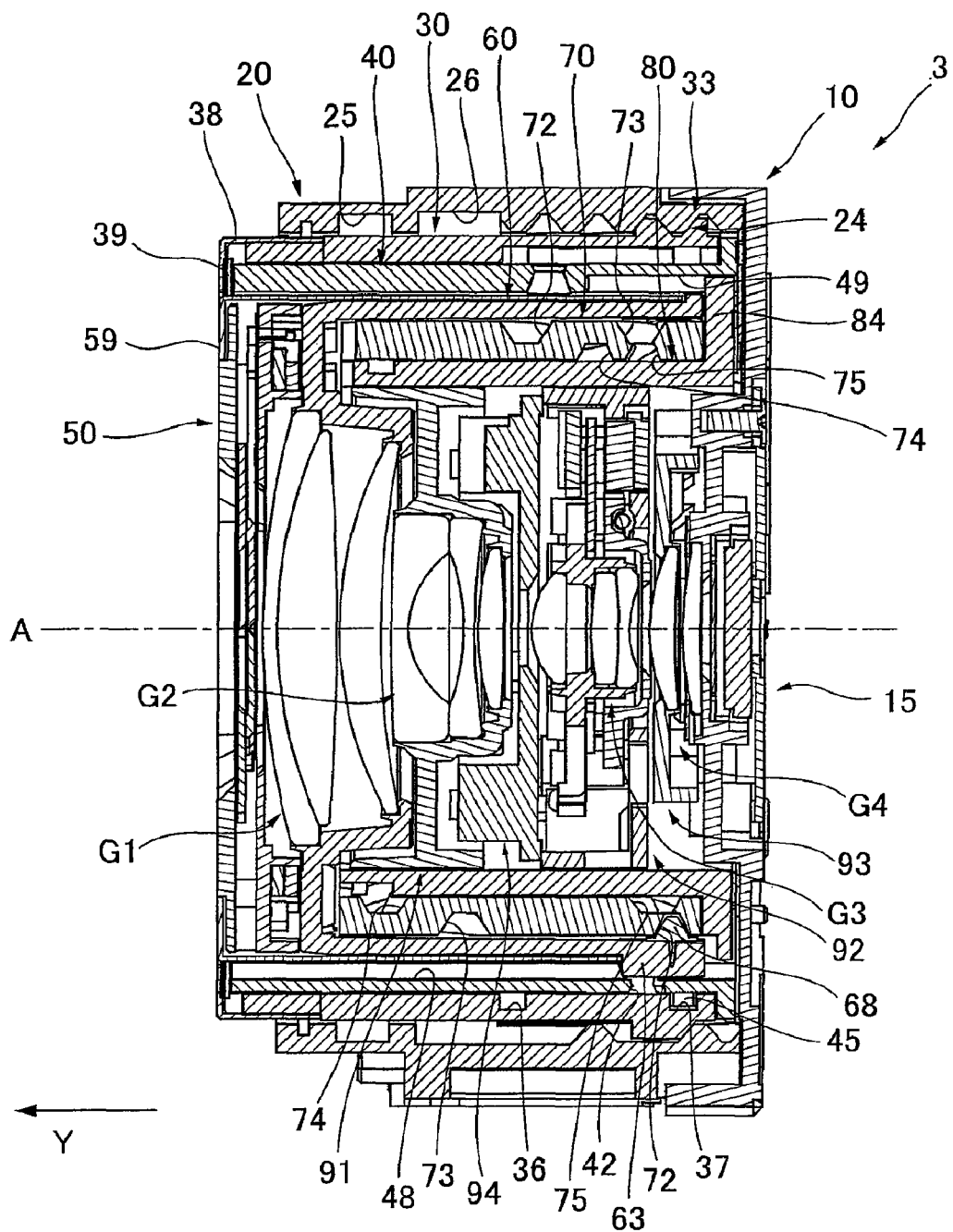
FIG. 8 is a general sectional view of a lens barrel (retracted position)
Figure 9:
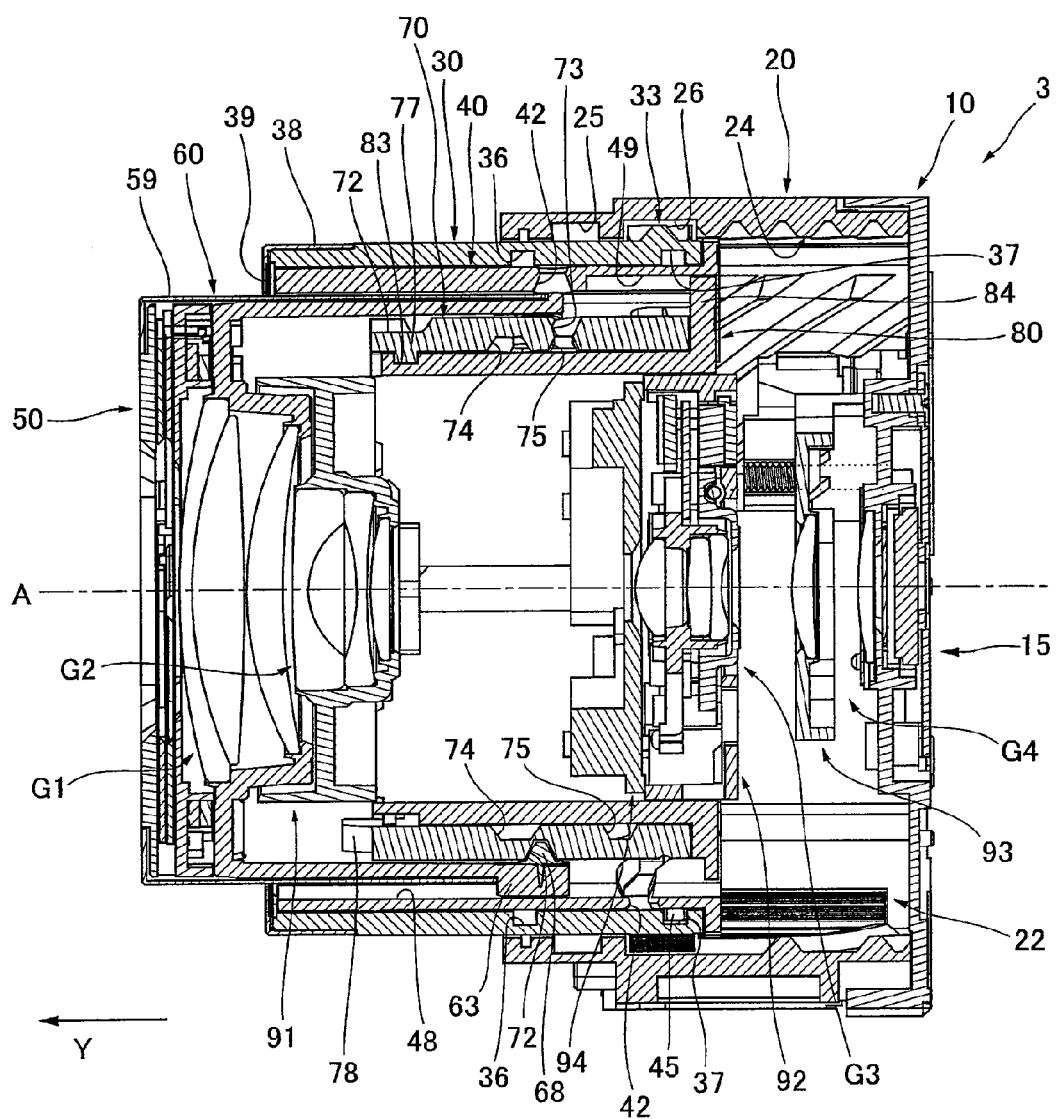
FIG. 9 is an exploded perspective view of a lens barrel (wide angle position)

The overall configuration of the lens barrel 3 will be described with reference to FIGS. 3 to 10. FIGS. 3A and 3B are schematic perspective views of the lens barrel 3, and FIGS. 4 to 7 are exploded perspective views of the lens barrel 3. FIG. 3A is a schematic perspective view of the lens barrel 3 in a retracted state, and FIG. 3B is a schematic perspective view of the lens barrel 3 in a photographing state. FIGS. 8 and 9 are general sectional views of the lens barrel 3. FIG. 8 is a sectional view in a retracted position, FIG. 9 is a sectional view in a wide angle end, and FIG. 10 is a sectional view in a telephoto end.

Figure 10:
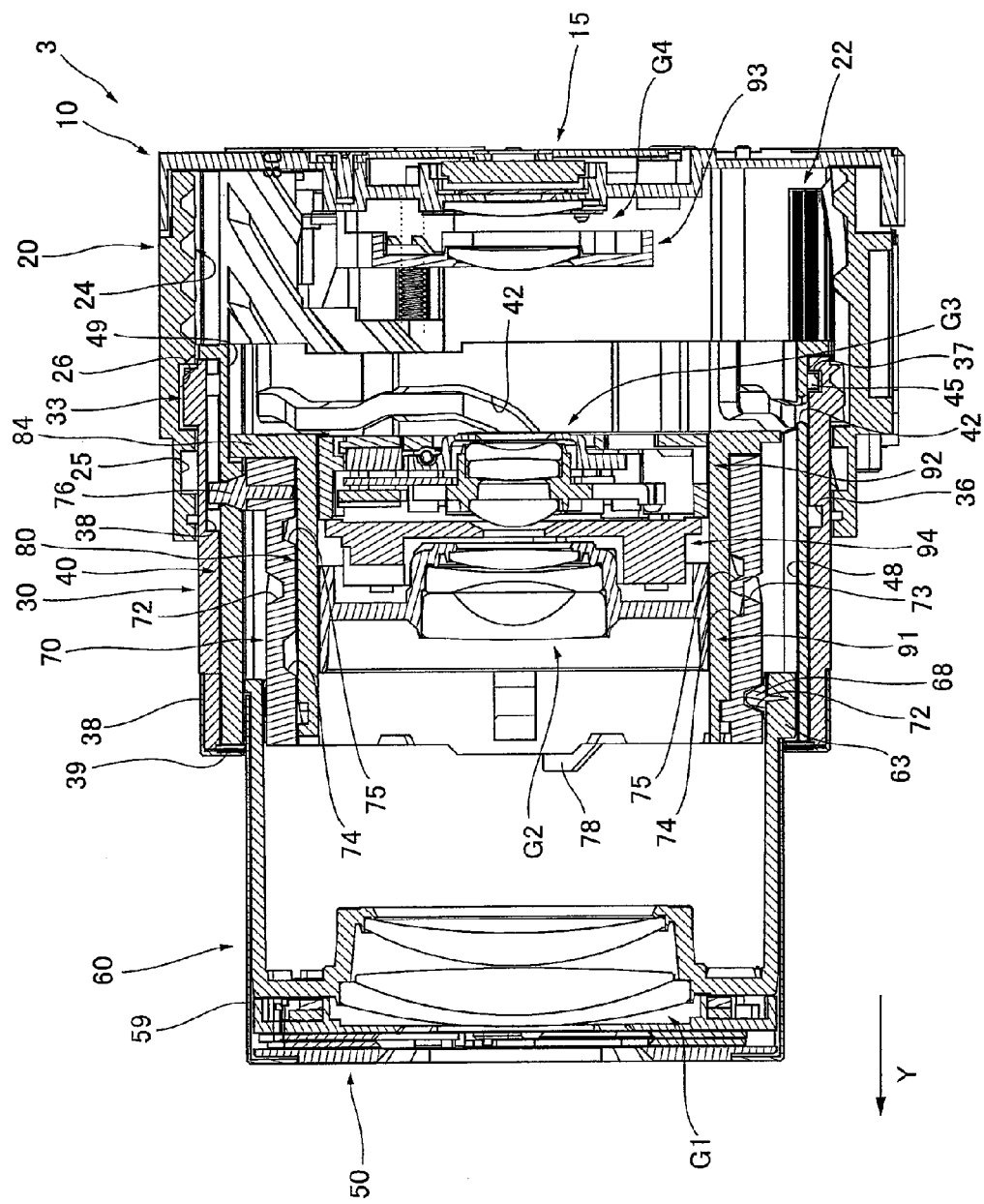
FIG. 10 is an exploded perspective view of a lens barrel (telephoto position)

As shown in FIGS. 8 to 10, the imaging optical system O includes a first lens group G1, a second lens group G2, a third lens group G3, and a fourth lens group G4. The first lens group G1 is, for example, a lens group having positive optical power as a whole and taking in the light from a subject. The second lens group G2 is, for example, a lens group having negative optical power as a whole. It is possible to adjust the zoom magnification of the imaging optical system O via the first lens group G1 and the second lens group G2. The third lens group G3 is, for example, a lens group for correcting the blurring of an image (the image blur) caused by movements of the digital camera 1. The fourth lens group G4 is, for example, a lens group for adjusting the focus. The imaging optical system O is supported to be relatively movable in the Y axis direction by the lens barrel 3.

As shown in FIG. 3, the lens barrel 3 is mainly includes a master flange 10, a zoom motor 11, a stationary frame 20, a drive frame 30, a camera cam frame 40, a rotation cam frame 70, a straight-movement frame 80, and a shutter unit 94. The master flange 10 is fixed to the outer case 2. The zoom motor 11 serving as a drive source is fixed to the master flange 10. The stationary frame 20 holds various frames between itself and the master flange 10. The drive force generated by the zoom motor 11 is inputted to the drive frame 30. The camera cam frame 40 (second cam frame) is supported to be movable in the Y axis direction by the stationary frame 20. The rotation cam frame 70 (first cam frame, first frame) rotates with the drive frame 30. The straight-movement frame 80 moves in the Y axis direction relative to the stationary frame 20 without rotating relative thereto. Although the drive frame 30 and the rotation cam frame 70 are rotatable relative to the stationary frame 20 and are movable in the Y axis direction relative thereto, the members other than the drive frame 30 and the rotation cam frame 70 are movable in the Y axis direction relative to the stationary frame 20 without rotating relative thereto. The CCD unit 15 is mounted on the master flange 10. Examples of the zoom motor 11 include a DC motor.

The lens barrel 3 further includes a first lens frame 60 (second frame) supporting the first lens group G1, a second lens frame 91 supporting the second lens group G2, a third lens frame 92 supporting the third lens group G3, and a fourth lens frame 93 supporting the fourth lens group G4.

3.1. Stationary Frame

The stationary frame 20 is a member for supporting the drive frame 30 to be rotatable around the optical axis A and to be movable in the Y axis direction (straight-movement direction), and makes up the motionless members of the lens barrel 3 with the master flange 10. The stationary frame 20 is fixed to the master flange 10 by screws, for example. The stationary frame 20 mainly includes a stationary frame body 21 that is substantially cylindrical and that forms the main portions, and a drive gear 22 that is supported to be rotatable by the stationary frame body 21.

The stationary frame body 21 is fixed to the master flange 10, and the drive frame 30 is disposed on the inner periphery side of the stationary frame body 21. The drive gear 22 is a member provided to transmit the drive force generated by the zoom motor 11 to the drive frame 30, and engages with the gear (not shown) of the zoom motor 11.

Three sloped grooves 23, a first helicoid screw portion 24, three first rotation grooves 25, a second rotation groove 26, and three straight-movement grooves 27 are formed on the inner periphery side of the stationary frame body 21. The sloped grooves 23, the first helicoid screw portion 24, the first rotation grooves 25, and the second rotation groove 26 are grooves arranged to guide the drive frame 30. The straight-movement grooves 27 are grooves provided to guide the camera cam frame 40.

The sloped grooves 23 engage with cam pins 34 (described later) of the drive frame 30, and are disposed at a constant pitch in the circumferential direction. The first helicoid screw portion 24 engages with a second helicoid screw portion 33 (described later) of the drive frame 30. The sloped angle of the sloped grooves 23 is same as that of the first helicoid screw portion 24.

The second rotation groove 26 is disposed on the positive side of the first helicoid screw portion 24 in the Y axis direction, and guides the gear portion 32 (described later) and the second helicoid screw portion 33 of the drive frame 30 in the rotational direction. The first rotation grooves 25 are disposed on the positive side of the second rotation groove 26 in the Y axis direction, and guide the cam pins 34 in the rotational direction. The sloped grooves 23 are separated by the second rotation groove 26 in the Y axis direction. The first rotation grooves 25 form substantially one guide groove with the sloped grooves 23.

3.2. Drive Frame

The drive frame 30 is a member provided to support the camera cam frame 40 to be rotatable around the optical axis A and to be movable as a whole in the Y axis direction, and is disposed on the inner periphery side of the stationary frame 20. The drive force is inputted to the drive frame 30 from the zoom motor 11, and is transmitted to the other members via the drive frame 30.

The drive frame 30 mainly includes a drive frame body 31, a gear portion 32, a second helicoid screw portion 33, and three cam pins 34. The drive frame body 31 is substantially cylindrical and is disposed on the inner periphery side of the stationary frame body 21. The gear portion 32 is formed on the outer periphery side of the drive frame body 31. The second helicoid screw portion 33 that is formed on the outer periphery side of the drive frame body 31. The three cam pins 34 are formed on the outer periphery side of the drive frame body 31. A decorative ring 39*a* is mounted in the Y axis direction of the drive frame body 31. A light shielding ring 39*b* is interposed between the decorative ring 39*a* and the drive frame body 31.

The gear portion 32 engages with the drive gear 22 of the stationary frame 20. Thus, the drive force of the zoom motor 11 is transmitted to the drive frame 30 via the drive gear 22. The second helicoid screw portion 33 engages with the first helicoid screw portion 24 of the stationary frame 20. The three cam pins 34 are disposed at a constant pitch in the circumferential direction. The cam pins 34 are fitted in the sloped grooves 23 of the stationary frame 20. Therefore, the drive frame 30 moves in the Y axis direction relative to the stationary frame 20 with rotating relative thereto around the optical axis A.

A first rotation groove 36, a second rotation groove 37, six introduction grooves 35, and three straight-movement grooves 38 are formed on the inner periphery side of the drive frame body 31. The first rotation groove 36 guides first rotation protrusions 43 (described later) of the camera cam frame 40 in the rotational direction. The second rotation groove 37 (refer to FIGS. 8 to 10) are disposed on the negative side of the first rotation groove 36 in the Y axis direction, and guides second rotation protrusions 44 (described later) and third rotation protrusions 45 (described later) of the camera cam frame 40 in the rotational direction. The introduction grooves 35 are grooves provided to guide the first rotation protrusions 43, the second rotation protrusions 44, and the third rotation protrusions 45 to the first rotation groove 36 and the second rotation groove 37, and are connected to the first rotation groove 36 and the second rotation groove 37. The six introduction grooves 35 are disposed at a constant pitch in the circumferential direction, and extend in the Y axis direction. The straight-movement grooves 38 (refer to FIG. 10) are grooves provided to guide cam pins 76 (described later) of the rotation cam frame 70, and are disposed between the introduction grooves 35 in the circumferential direction and on the negative side of the drive frame 30 in the Y axis direction. The three straight-movement grooves 38 are disposed at a constant pitch in the circumferential direction.

The drive frame 30 is driven around the optical axis A (R1 direction, R2 direction, and rotational direction) in response to the drive force generated by the zoom motor 11. For example, when changing from the retracted state to the photographing state, the drive frame 30 is driven in the R1 direction by the zoom motor 11. As a result, the cam pins 34 moving along the sloped grooves 23 of the stationary frame 20, and the second helicoid screw portion 33 moves along the first helicoid screw portion 24. This results the drive frame 30 to move to the positive side in the Y axis direction relative to the stationary frame 20 with rotating relative thereto.

When the drive frame 30 is further driven to the R1 direction, the cam pins 34 reach the first rotation grooves 25, and the cam pins 34 move along the first rotation grooves 25 in the rotational direction. At this time, the second helicoid screw portion 33 moves along the second rotation groove 26 in the rotational direction. As a result, the drive frame 30 rotates relative to the stationary frame 20 without moving relative thereto in the Y axis direction. In other words, the drive frame 30 does not move in the Y axis direction relative to the stationary frame 20, when the rotation of the drive frame 30 reaches a predetermined angle.

In this embodiment, during the retraction operation, the drive frame 30 moves in the Y axis direction while rotating relative to the stationary frame 20, and during the zoom operation, the drive frame 30 rotates without moving in the Y axis direction relative to the stationary frame 20.

In addition, when changing from the photographing state to the retracted state, the drive frame 30 is driven in the R2 direction by the zoom motor 11. As a result, the cam pins 34 of the drive frame 30 move along the first rotation grooves 25, and move along the sloped grooves 23 after the cam pins 34 reach the sloped grooves 23. As a result, the drive frame 30 moves to the negative side in the Y axis direction relative to the stationary frame 20 with rotating relative thereto, and the drive frame 30 is accommodated inside the stationary frame 20.

3.3. Camera Cam Frame

Figure 5:
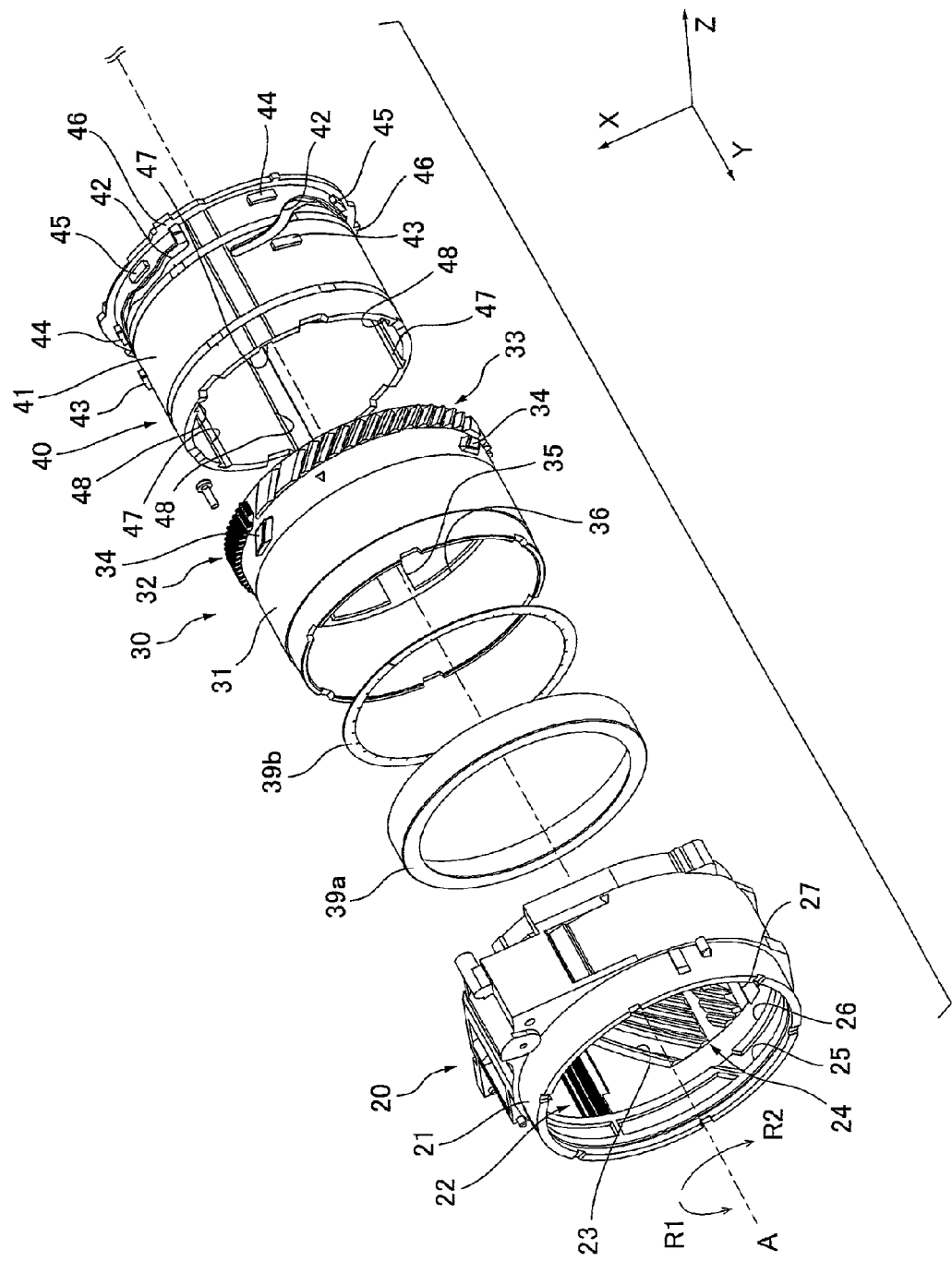
FIG. 5 is an exploded perspective view of a lens barrel.
Figures 11A, 11B:
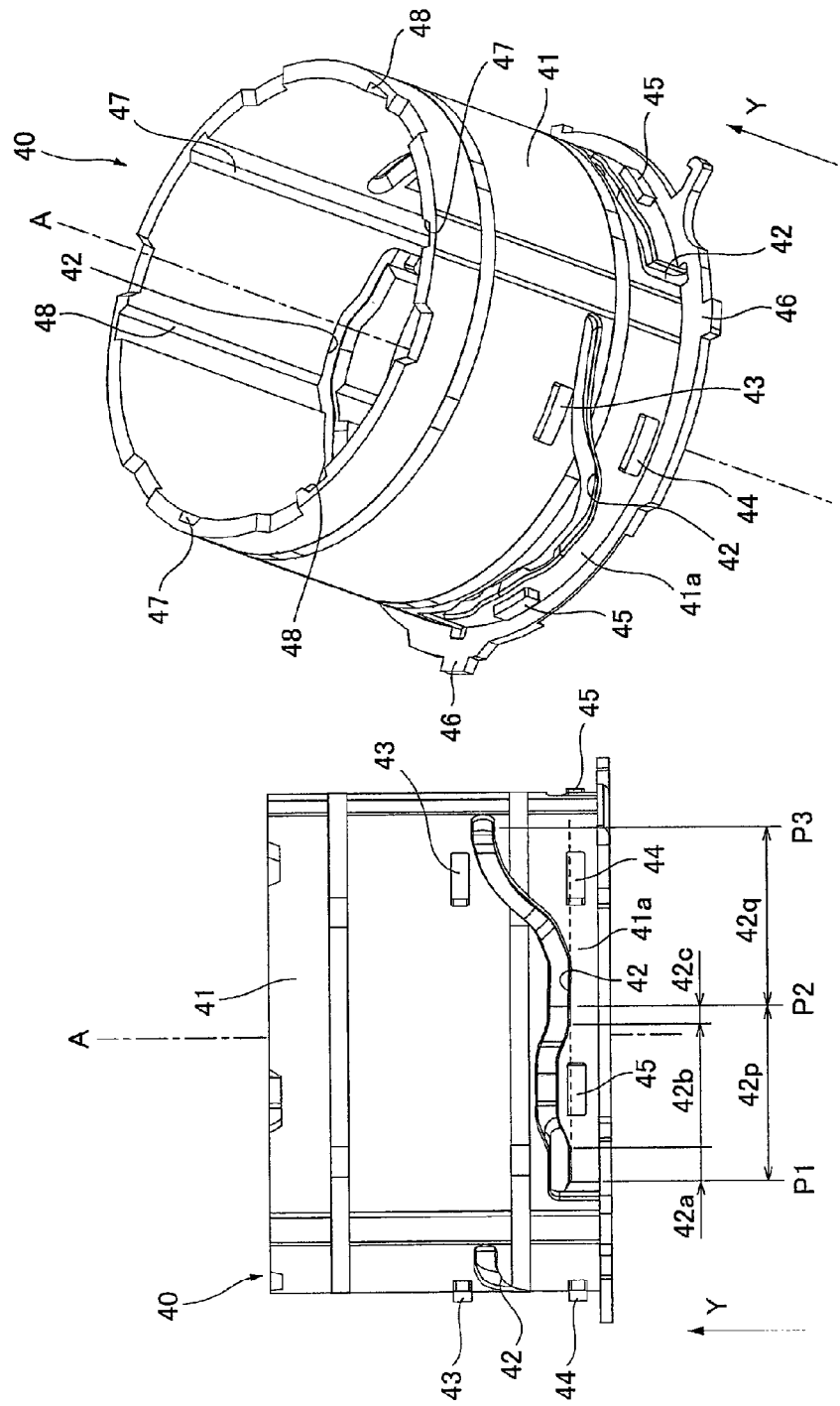
FIGS. 11A and 11B are detail views of the camera cam frame.

FIGS. 11A and 11B are detail views of the camera cam frame 40. The camera cam frame 40 is a member provided to limit the rotation of the first lens frame 60 relative to the stationary frame 20, and is disposed on the inner periphery side of the drive frame 30. As shown in FIGS. 5, 11A, and 11B, the camera cam frame 40 mainly includes a camera cam frame body 41, three penetration cam grooves 42, and three straight-movement pins 46. The camera cam frame body 41 is substantially cylindrical and forms the main part thereof.

The three penetration cam grooves 42 are formed on the camera cam frame body 41. The three straight-movement pins 46 are formed on the outer periphery side of the camera cam frame body 41. The three penetration cam grooves 42 are disposed at a constant pitch in the circumferential direction. The three straight-movement pins 46 are disposed at a constant pitch in the circumferential direction. The straight-movement pins 46 are guided in the Y axis direction by the straight-movement grooves 27 of the stationary frame 20. This allows the camera cam frame 40 to move relative to the stationary frame 20 in the Y axis direction without rotating relative thereto.

Three first rotation protrusions 43 (first protrusions), three second rotation protrusions 44 (second protrusions), and three third rotation protrusions 45 (third protrusions) are formed on the outer periphery side of the camera cam frame body 41. The first rotation protrusions 43 are mainly used for positioning, and are guided in the rotational direction by the first rotation groove 36 of the drive frame 30. The first rotation protrusions 43 and the second rotation protrusions 44 are mainly provided for strengthening the camera cam frame body 41, and are inserted in the second rotation groove 37 of the drive frame 30. This allows the camera cam frame 40 to rotate relative to the drive frame 30 according to need while moving integrally with the drive frame 30 in the Y axis direction.

When the drive frame 30 rotates relative to the stationary frame 20, the drive frame 30 moves in the Y axis direction relative to the stationary frame 20. At this time, the camera cam frame 40 moves in the Y axis direction with the drive frame 30 relative to the stationary frame 20 without rotating relative thereto (in other words, while rotating relative to the drive frame 30).

3.3.1. Configuration Around the Penetration Cam Grooves

Here, the positional relationships of the first rotation protrusions 43, the second rotation protrusions 44, the third rotation protrusions 45, and the penetration cam grooves 42 will be described. The first rotation protrusions 43 are disposed on the positive side in the Y axis direction of the second rotation protrusions 44. The second rotation protrusions 44 and the third rotation protrusions 45 are disposed on the same position in the Y axis direction. The first rotation protrusions 43 and the second rotation protrusions 44 are disposed on the same position in the rotational direction.

The first rotation protrusions 43, the second rotation protrusions 44, and the third rotation protrusions 45 are disposed near the penetration cam grooves 42. In particular, as shown in FIG. 11, the first rotation protrusions 43 are disposed on the positive side (the second axial side) of the penetration cam grooves 42 in the Y axis direction, and the second rotation protrusions 44 and the third rotation protrusions 45 are disposed on the negative side (the first axial side) of the penetration cam grooves 42 in the Y axis direction.

The penetration cam grooves 42 include retracting regions 42p, and photographing regions 42q. The retracting regions 42p guide the cam pins 76 (described later) of the rotation cam frame 70 during the retraction operation of the lens barrel 3, and the photographing regions 42q guide the cam pins 76 of the rotation cam frame 70 during the zoom operation.

The first rotation protrusions 43 and the second rotation protrusions 44 are disposed on the positive side and negative side in the Y axis direction of the photographing regions 42q. In other words, the photographing regions 42q are disposed between the first rotation protrusions 43 and the second rotation protrusions 44 in the Y axis direction. The first rotation protrusions 43 and the second rotation protrusions 44 are disposed between a wide angle position P2 and a telephoto position P3 of the photographing regions 42q in the rotational direction. More specifically, part of the second rotation protrusion 44 is accommodated in the area in which the penetration cam groove 42 curves toward the positive side in the Y axis direction between the wide angle position P2 and the telephoto position P3. Part of the second rotation protrusion 44 overlaps with the penetration cam groove 42 in the Y axis direction at the wide angle position P2.

In addition, part of the third rotation protrusions 45 is accommodated in the area in which the retracting region 42p curves toward the positive side in the Y axis direction. More specifically, the retracting regions 42p include first retracting regions 42a having the retracted positions P1, second retracting regions 42b, and third retracting regions 42c. The third retracting regions 42c are adjacent to the wide angle positions P2 of the photographing regions 42q, and the third retracting regions 42c are disposed on positions substantially the same as the first retracting regions 42a in the Y axis direction. The second retracting regions 42b are disposed between the first retracting regions 42a and the third retracting regions 42c, and are disposed to the positive side in the Y axis direction compared to the first retracting regions 42a and the third retracting regions 42c. In other words, only the part corresponding to the second retracting region 42b in the retracting region 42p of the penetration cam groove 42 curves toward the positive side in the Y axis direction. The third rotation protrusions 45 are disposed on the negative side in the Y axis direction of the second retracting regions 42b. The dimension of the second retracting regions 42b in the rotational direction is greater than the dimensions of the third rotation protrusions 45 in the rotational direction. Part of the third rotation protrusion 45 overlaps with the penetration cam groove 42 in the Y axis direction in the first retracting region 42a and the third retracting region 42c.

In addition, the dimensions of the second rotation protrusions 44 and the third rotation protrusions 45 in the Y axis direction are smaller than that of the first rotation protrusions 43. The dimensions of the first rotation groove 36 and the second rotation groove 37 of the drive frame 30 are the same in the Y axis direction. In other words, the difference in the dimensions of the first rotation groove 36 of the drive frame 30 and the first rotation protrusions 43 in the Y axis direction is smaller than the difference in the dimensions of the second rotation groove 37 of the drive frame 30 and the second rotation protrusions 44 in the Y axis direction, and are smaller than the difference in the dimensions of the second rotation groove 37 of the drive frame 30 and the third rotation protrusions 45 in the Y axis direction. The first rotation protrusions 43 are in contact with the first rotation groove 36 in the Y axis direction. As a result, the camera cam frame 40 is positioned relative to the drive frame 30 in the Y axis direction by the first rotation protrusions 43 and the first rotation groove 36. In the state that the camera cam frame 40 is being positioned relative to the drive frame 30 in the Y axis direction, very small gaps are secured between the second rotation protrusions 44 and the second rotation groove 37, and between the third rotation protrusions 45 and the second rotation groove 37. The second rotation protrusions 44 and the third rotation protrusions 45 are not in contact with the second rotation groove 37 on both sides in the Y axis direction.

Here, the photographing regions 42q means regions in which the penetration cam grooves 42 support the cam pins 76 of the rotation cam frame 70 during the zoom operation of the lens barrel 3, for example. The retracting regions 42p means regions in which the penetration cam grooves 42 support the cam pins 76 during the retraction operation of the lens barrel 3, for example.

Since the retracted positions P1 mean the regions corresponding to the state that the lens barrel 3 is most retracted in the penetration cam grooves 42, if the lens barrel 3 is in the retracted state, the cam pins 76 are disposed in the retracted positions P1. Since the wide angle positions P2 mean the regions corresponding to the state that the zoom magnification of the imaging optical system O is the lowest (wide angle end) in the penetration cam grooves 42, if the lens barrel 3 is at the wide angle end, the cam pins 76 are disposed on the wide angle positions P2. Since the telephoto positions P3 mean the portions corresponding to the state that the zoom magnification of the imaging optical system O is the highest (telephoto end) in the penetration cam grooves 42, if the lens barrel 3 is at the telephoto end, the cam pins 76 are disposed on the telephoto positions P3.

In this embodiment, for example, the actuation position of the lens barrel 3 is set at the wide angle position P2. The actuation position means the initial set position of the lens barrel 3 in the case that the digital camera 1 is turned on, for example.

3.3.2. First Straight-Movement Grooves, Second Straight-Movement Grooves

Three first straight-movement grooves 47, three second straight-movement grooves 48, and three third straight-movement grooves 49 (refer to FIGS. 8 to 10) are formed on the inner periphery side of the camera cam frame body 41. The three first straight-movement grooves 47 are grooves for guiding second straight-movement pins 64 (described later) of the first lens frame 60, and are disposed at a constant pitch in the circumferential direction. The three second straight-movement grooves 48 are grooves for guiding first straight-movement pins 63 (described later) of the first lens frame 60, and are disposed at a constant pitch in the circumferential direction. As described later, the first straight-movement grooves 47 are mainly used for positioning, and the second straight-movement grooves 48 are mainly used for strengthening. The three third straight-movement grooves 49 are formed on the negative side in the Y axis direction of the camera cam frame body 41, and are disposed at a constant pitch in the circumferential direction.

The first straight-movement grooves 47 are disposed between two adjacent penetration cam grooves 42 in the circumferential direction, and do not intersect with the penetration cam grooves 42. On the other hand, the second straight-movement grooves 48 intersect with the penetration cam grooves 42, and are separated into two areas by the penetration cam grooves 42.

3.4. First Lens Frame

Figure 12:
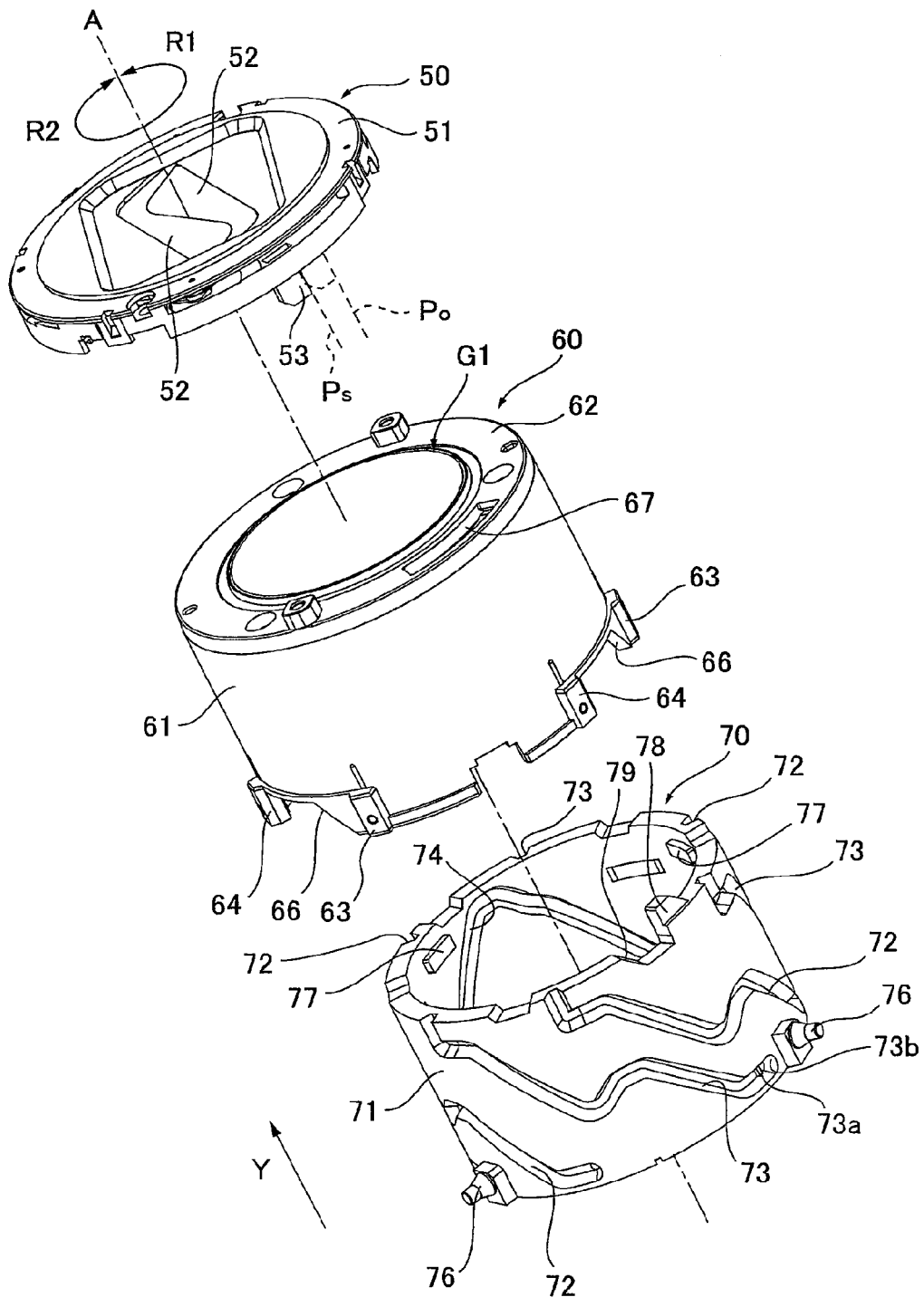
FIG. 12 is an exploded perspective view of a lens barrier, a first lens frame and a rotation cam frame.
Figure 13:
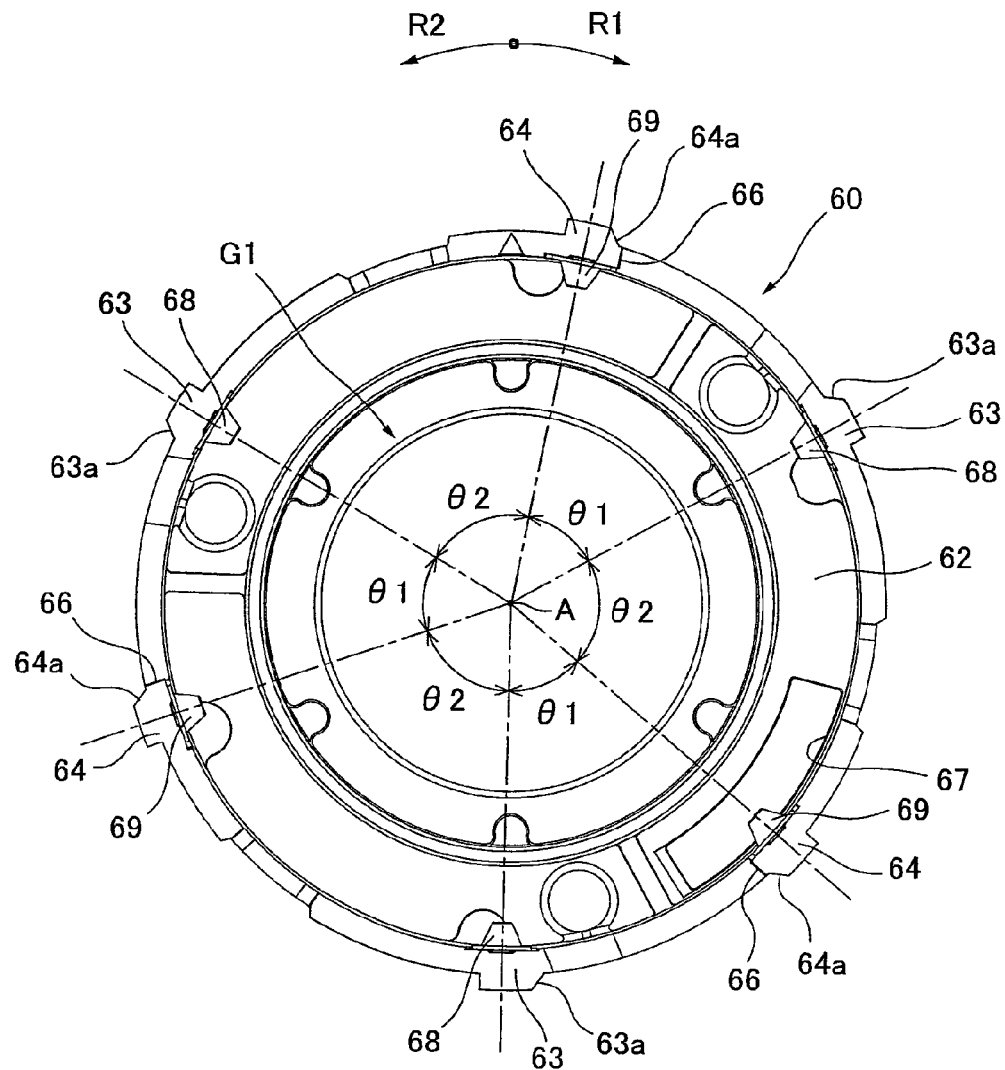
FIG. 13 is a plan view looked from the negative side in a Y axis direction of the first lens frame.

FIG. 12 is a perspective view of a lens barrier 50, a first lens frame 60, and a rotation cam frame 70. FIG. 13 is a plan view looking from the negative side in the Y axis direction of the first lens frame 60. FIGS. 14A, 14B, and 14C are relationship diagrams of the first lens frame 60 and the camera cam frame 40. FIGS. 15A and 15B are detail views of the areas around a first cam pin 68 and a second cam pin 69.

The first lens frame 60 is a member arranged to support the first lens group G1, and is disposed on the inner periphery side of the camera cam frame 40. More specifically, as shown in FIGS. 6 and 12 to 14B, the first lens frame 60 mainly includes a first lens frame body 61 (second frame body, support frame body), and a flange portion 62 on which a first lens group G1 is fixed. The flange portion 62 is provided on an end portion in the Y axis direction of the first lens frame body 61. An opening portion 67 that penetrates in the Y axis direction is formed on the flange portion 62. An operating lever 53 (described later) of the lens barrier 50 and a drive lever 78 of the rotation cam frame 70 are inserted in the opening portion 67 to be movable in the rotational direction. The lens barrier 50 is fixed on the positive side in the Y axis direction of the first lens frame 60. The lens barrier 50 and the first lens frame 60 are covered by a decorative ring 59.

Three first straight-movement pins 63 and three second straight-movement pins 64 (first cam portions) are provided on the outer periphery side of the first lens frame body 61. Three first cam pins 68 and three second cam pins 69 (second cam portions) are provided on the inner periphery side of the first lens frame body 61. In addition, the first straight-movement pins 63 and the second straight-movement pins 64 are examples of the first cam portions. The first cam pins 68 and the second cam pins 69 are examples of the second cam portions.

The second straight-movement pins 64 are mainly used for positioning, and the first straight-movement pins 63 are mainly used for strengthening. The second straight-movement pins 64 are guided to the Y axis direction by the first straight-movement grooves 47 of the camera cam frame 40. The first straight-movement pins 63 are inserted in the second straight-movement grooves 48 of the camera cam frame 40.

As a result, the first lens frame 60 moves in the Y axis direction without rotating relative to the camera cam frame 40. In other words, the rotation of the first lens frame 60 relative to the stationary frame 20 is limited by the camera cam frame 40, and the first lens frame 60 is supported by the camera cam frame 40 to be movable in the Y axis direction without rotating relative to the stationary frame 20.

The first cam pins 68 are mainly used for positioning, and the second cam pins 69 are mainly used for strengthening. The first cam pins 68 are guided by first cam grooves 72 (described later) of the rotation cam frame 70. The second cam pins 69 are inserted in second cam grooves 73 (described later) of the rotation cam frame 70.

As a result, the first lens frame 60 is supported by the rotation cam frame 70 to be movable in the Y axis direction while rotating relative to the rotation cam frame 70.

3.4.1. Configuration of the First Straight-movement pins 63, the Second Straight-movement pins 64, the First Cam Pins 68, and the Second Cam Pins 69

Here, the first straight-movement pins 63, the second straight-movement pins 64, the first cam pins 68, and the second cam pins 69 will be described. As shown in FIG. 13, the first cam pins 68 (second cam pins) are disposed on the opposite side of the first straight-movement pins 63 in the radial direction relative to the first lens frame body 61. The second cam pins 69 (first cam pins) are disposed on the opposite side from the second straight-movement pins 64 in the radial direction relative to the first lens frame body 61. The first straight-movement pins 63 and the second straight-movement pins 64 are integrally formed with the first lens frame body 61, and are protruded out from the first lens frame body 61 in the radial direction. The first cam pins 68 and the second cam pins 69 are separate members from the first lens frame body 61, and are fixed on the inner periphery side of the first lens frame body 61.

The first straight-movement pins 63 and the second straight-movement pins 64 have substantially symmetrical shapes in the rotational direction. The first straight-movement pins 63 have first tapered surfaces 63a on the R1 side of the rotational direction, and the second straight-movement pins 64 have second tapered surfaces 64a on the R2 side of the rotational direction.

The second straight-movement pins 64 are inserted in the first straight-movement grooves 47 of the camera cam frame 40. More specifically as shown in FIG. 14C, the first straight-movement grooves 47 have a complementary sectional shape with the second straight-movement pins 64. The dimension of the second straight-movement pins 64 in the rotational direction is somewhat smaller compared to the first straight-movement pins 63. The second tapered surfaces 64a of the second straight-movement pins 64 and the tapered surfaces 47a of the first straight-movement grooves 47 are in contact with each other. The contacting surfaces 64b of the second straight-movement pins 64 and the contacting surfaces 47b of the first straight-movement grooves 47 are in contact with each other. Therefore, the first lens frame 60 is basically positioned relative to the camera cam frame 40 in the rotational direction and the radial direction by the second straight-movement pins 64 and the first straight-movement grooves 47. In addition, very small gaps S2 are secured between the outer circumferential surfaces 64c of the second straight-movement pins 64 and the bottom surfaces 47c of the first straight-movement grooves 47 in the radial direction.

On the other hand, the first straight-movement pins 63 are inserted in the second straight-movement grooves 48 of the camera cam frame 40. The second straight-movement grooves 48 have a complementary sectional shape with the first straight-movement pins 63.

As shown in FIG. 14C, however, very small gaps S3 are secured between the first straight-movement pins 63 and the second straight-movement grooves 48 in the rotational direction and in the radial direction, and the first straight-movement pins 63 and the second straight-movement grooves 48 are not in contact. Since the gaps S3 are very small, if the first lens frame body 61 elastically deforms, the first straight-movement pins 63 and the second straight-movement grooves 48 are contactable with each other.

In this way, the first lens frame 60 is basically positioned relative to the camera cam frame 40 by only the second straight-movement pins 64 and the first straight-movement grooves 47. For example, when a user drops the digital camera 1, the impact can be received by the first straight-movement pins 63 in addition to the second straight-movement pins 64. Therefore, the impact can be dispersed to the first straight-movement pins 63 and the second straight-movement pins 64 when the digital camera 1 is dropped, which prevents the first straight-movement pins 63 and the second straight-movement pins 64 from being damaged.

Unlike the first straight-movement pins 63 and the second straight-movement pins 64, although the first cam pins 68 and the second cam pins 69 have the same shapes, the second cam pins 69 are disposed radially outward compared to the first cam pins 68. More specifically, as shown in FIG. 15, second bearing surfaces 69a for the second cam pins 69 formed on the first lens frame body 61 are disposed radially outward by dimension T compared to first bearing surfaces 68a formed on the first lens frame body 61 to use for the first cam pins 68. The first cam grooves 72 and the second cam grooves 73 of the rotation cam frame 70 have the same shapes. Since the first cam pins 68 are in contact with the first cam grooves 72, the first lens frame 60 is positioned relative to the rotation cam frame 70 in the rotational direction and the radial direction are done by the first cam pins 68 and the first cam grooves 72.

On the other hand, gaps S1 are secured between the second cam pins 69 and the second cam grooves 73 in the rotational direction and in the radial direction, and the second cam pins 69 and the second cam grooves 73 basically are not in contact with each other. Since the gaps S1 are very small, if the first lens frame body 61 elastically deforms, the second cam pins 69 and the second cam grooves 73 are contactable with each other.

In this way, the first lens frame 60 relative to the camera cam frame 40 basically is positioned by only the first cam pins 68 and the first cam grooves 72. For example, if a user drops the digital camera 1, the impact can be received by the second cam pins 69 in addition to the first cam pins 68. Therefore, the impact to the first cam pins 68 and the second cam pins 69 can be dispersed when the digital camera 1 is dropped, and this prevents the first cam pins 68 and the second cam pins 69 from being damaged.

In addition, the first straight-movement pins 63, the second straight-movement pins 64, the first cam pins 68, and the second cam pins 69 are also characterized in the arrangement in the circumferential direction. More specifically, as shown in FIG. 13, the three first cam pins 68 (first set) are disposed at a constant pitch in the circumferential direction, and the three second cam pins 69 (second set) are disposed at a constant pitch in the circumferential direction. In contrast, the first cam pins 68 and the second cam pins 69 are disposed at an irregular pitch in the circumferential direction.

The first cam pins 68 are disposed at locations closer to the second cam pins 69 disposed on the side of the rotational direction R1 than the second cam pins 69 disposed on the side of the rotational direction R2. The angle θ1 between the first cam pin 68 and the second cam pin 69 disposed on rotational direction R2 side is smaller than the angle θ2 between the first cam pin 68 and the second cam pin 69 disposed on the rotational direction R1 side. With regard to the relationship between angles θ1 and θ2, the same relationship also establishes with the first straight-movement pins 63 and the second straight-movement pins 64.

In this way, since the first cam pins 68 and the second cam pins 69 are disposed at an irregular pitch in the circumferential direction, the first lens frame 60 is prevented from being attached in the wrong direction relative to the rotation cam frame 70. In addition, the standard for the pitch is the center of each pin in the circumferential direction, for example.

3.5. Rotation Cam Frame

The rotation cam frame 70 is a member provided to support the first lens frame 60, the second lens frame 91, the third lens frame 92, and the fourth lens frame 93 to be movable in the Y axis direction, and is disposed on the inner periphery side of the first lens frame 60. More specifically, as shown in FIGS. 6 and 12, the rotation cam frame 70 mainly includes a cam frame body 71 (first frame body), and three cam pins 76 disposed on the outer periphery side of the cam frame body 71. The three cam pins 76 are disposed at a constant pitch in the circumferential direction.

Since the ends of the cam pins 76 are inserted in the straight-movement grooves 38 (refer to FIG. 10) of the drive frame 30, the rotation cam frame 70 is movable in the Y axis direction relative to the drive frame 30 while rotating integrally with the drive frame 30. In addition, since the cam pins 76 pass through the penetration cam grooves 42 of the camera cam frame 40, when the drive frame 30 and the camera cam frame 40 relatively rotate, the rotation cam frame 70 and the camera cam frame 40 relatively rotate. At this time, the cam pins 76 move along the penetration cam grooves 42, and therefore the rotation cam frame 70 moves in the Y axis direction relative to the drive frame 30 in accordance with the shape of the penetration cam grooves 42 while rotating with the drive frame 30.

According to the above described configuration, the rotation cam frame 70 rotates integrally with the drive frame 30, and is movable in the Y axis direction relative to the drive frame 30. In other words, the rotation cam frame 70 is movable in the Y axis direction while rotating relative to the stationary frame 20. The displacement of the rotation cam frame 70 in the Y axis direction is the summation of the displacement of the drive frame 30 in the Y axis direction relative to the stationary frame 20 and the displacement of the rotation cam frame 70 in the Y axis direction relative to the drive frame 30.

As described above, since the first lens frame 60 is supported by the rotation cam frame 70, the displacement of the first lens frame 60 in the Y axis direction relative to the stationary frame 20 is the summation of the displacement of the rotation cam frame 70 in the Y axis direction and the displacement of the first lens frame 60 in the Y axis direction relative to the rotation cam frame 70. This allows the lens barrel 3 to be miniaturized while securing the zoom magnification.

3.5.1. Configuration of the First Cam Grooves 72, and the Second Cam Grooves 73

Three first cam grooves 72 and three second cam grooves 73 are formed on the outer periphery side of the cam frame body 71. The three first cam grooves 72 are disposed at a constant pitch in the circumferential direction, and the three second cam grooves 73 are disposed at a constant pitch in the circumferential direction. The shape of the second cam grooves 73 is substantially the same as the shape of the first cam grooves 72, but different from the shape of the first cam grooves 72 on the point that step portions 73a are formed near end portions 73b of the second cam grooves 73.

The step portions 73a are contactable in the rotational direction with the ends of the second cam pins 69 guided to the second cam grooves 73. The height of the step portions 73a is set so that the ends of the second cam pins 69 can cross over the step portions 73a when the first lens frame 60 and the rotation cam frame 70 relatively rotate. If the second cam pins 69 cross over the step portions 73a, the movement of the second cam pins 69 between the end portions 73b of the second cam grooves 73 and step portions 73a is limited.

In other words, the first lens frame 60 and the rotation cam frame 70 can be treated as substantially a united member. When a predetermined torque acts between the first lens frame 60 and the rotation cam frame 70, the second cam pins 69 cross over the step portions 73a, and the relative rotation of the first lens frame 60 and the rotation cam frame 70 is permitted.

In this way, a lock mechanism of the first lens frame 60 and the rotation cam frame 70 is realized by the second cam pins 69 and the step portions 73a.

The grooves between the step portions 73a and the end portions 73b are used only when assembling, and are not used during the retraction operation and the zoom operation of the lens barrel 3.

3.5.2. Configuration of the Third Cam Grooves 74 and the Fourth Cam Grooves 75

Three third cam grooves 74 and three fourth cam grooves 75 are formed on the inner periphery side of the cam frame body 71. The three third cam grooves 74 are grooves provided to guide cam pins 91b (described later) of the second lens frame 91, and are disposed at a constant pitch in the circumferential direction. The fourth cam grooves 75 are grooves provided to guide cam pins 95b of a base frame 95 that forms the third lens frame 92, and are disposed at a constant pitch in the circumferential direction.

According to these configurations, the displacement of the second lens frame 91 in the Y axis direction relative to the stationary frame 20 is the summation of the displacement of the rotation cam frame 70 in the Y axis direction and the displacement of the second lens frame 91 in the Y axis direction relative to the rotation cam frame 70.

In addition, the displacement of the third lens frame 92 in the Y axis direction relative to the stationary frame 20 is the summation of the displacement of the rotation cam frame 70 in the Y axis direction and the displacement of the third lens frame 92 in the Y axis direction relative to the rotation cam frame 70.

3.5.3. Configuration of the Drive Lever 78

Furthermore, a drive lever 78 extending in the Y axis direction, and a recess 79 disposed adjacent to the drive lever 78 are formed on the positive side in the Y axis direction of the cam frame body 71. The drive lever 78 is provided to press the operating lever 53 (described later) of the lens barrier 50 to the rotational direction, and is disposed on the rotational direction R1 side of the operating lever 53. The recess 79 is a portion in which the operating lever 53 is accommodated in the Y axis direction, and is disposed on the rotational direction R2 side of the drive lever 78.

3.6. Lens Barrier

The lens barrier 50 is a mechanism to protect the first lens group G1 when the digital camera 1 is not in use, and is fixed to the positive side of the first lens frame 60 in the Y axis direction. More specifically, as shown in FIGS. 6 and 12, the lens barrier 50 mainly includes a barrier mechanism 51, a pair of barrier blades 52, and an operating lever 53. The barrier mechanism 51 supports the pair of barrier blades 52 to be openable and closable.

The opening and closing operation of the pair of barrier blades 52 is switched by the operating lever 53. More specifically, the operating lever 53 is supported by the barrier mechanism 51 to be movable in the rotational direction. For example, the operating lever 53 is movable in the rotational direction between the opened position Po and the closed position Ps (refer to FIG. 12). The operating lever 53 is disposed on the rotational direction R2 side of the drive lever 78 of the rotation cam frame 70. The operating lever 53 is driven by the drive lever 78.

In the state that no loads act on the operating lever 53, the pair of barrier blades 52 are held in the opened state (operating lever 53 at the opened position Po) by a spring (not shown) of the barrier mechanism 51. When the operating lever 53 is pressed to the rotational direction R2 side, the operating lever 53 moves to the closed position Ps, and the pair of barrier blades 52 are in the closed state. When the operating lever 53 is held in the closed position Ps, the pair of barrier blades 52 is also held in the closed state.

3.7. Straight-movement Frame

The straight-movement frame 80 is a member provided to prevent the second lens frame 91 and the third lens frame 92 from rotating relative to the stationary frame 20, and is disposed on the inner periphery side of the drive frame 30. More specifically, as shown in FIG. 6, the straight-movement frame 80 mainly includes a straight-movement frame body 81 that is substantially cylindrical, three straight-movement pins 84 that are formed on the outer periphery side of the straight-movement frame body 81, and straight-movement grooves 82 that extends in the Y axis direction.

The three straight-movement pins 84 are formed on the negative side in the Y axis direction of the straight-movement frame body 81, and are disposed at a constant pitch in the circumferential direction. Since the straight-movement pins 84 are guided by the third straight-movement grooves 49 that are formed on the inner periphery side of the camera cam frame 40, the straight-movement frame 80 is supported to be movable in the Y axis direction without rotating relative to the camera cam frame 40. As described previously, the camera cam frame 40 does not rotate relative to the stationary frame 20. In other words, the straight-movement frame 80 is movable in the Y axis direction without rotating relative to the stationary frame 20, via the camera cam frame 40.

The straight-movement grooves 82 are elongated openings penetrating in the radial direction, and are disposed at a constant pitch in the circumferential direction. The straight-movement grooves 82 guide the second lens frame 91 and the third lens frame 92 in the Y axis direction. More specifically, cam pins 91b (described later) of the second lens frame 91 and cam pins 95b (described later) of the base frame 95 that forms the third lens frame 92 pass through the straight-movement grooves 82. This allows the second lens frame 91 and the third lens frame 92 to move in the Y axis direction relative to the straight-movement frame 80 without rotating relative thereto. In other words, the second lens frame 91 and the third lens frame 92 are movable in the Y axis direction without rotating relative to the stationary frame 20 via the straight-movement frame 80 and the camera cam frame 40.

In addition, a rotation groove 83 is formed on the outer periphery side of the straight-movement frame body 81. The rotation groove 83 guides three rotation protrusions 77 disposed on the outer periphery side of the rotation cam frame 70 in the rotational direction. As a result, the straight-movement frame 80 moves integrally with the rotation cam frame 70 in the Y axis direction while rotating relative thereto.

3.8. Second Lens Frame

The second lens frame 91 is a member for supporting the second lens group G2 to be movable in the Y axis direction, and is disposed on the inner periphery side of the straight-movement frame 80. More specifically, as shown in FIG. 7, the second lens frame 91 mainly includes a second lens frame body 91a supporting the second lens group G2, and three cam pins 91b disposed on the outer periphery side of the second lens frame body 91a. The cam pins 91b pass through the straight-movement grooves 82 of the straight-movement frame 80, and are inserted in the second cam grooves 73 of the rotation cam frame 70. As a result, the second lens frame 91 is movable in the Y axis direction in accordance with the shape of the second cam grooves 73, without rotating relative to the stationary frame 20.

3.9. Third Lens Frame

The third lens frame 92 is a mechanism for supporting the third lens group G3 to be movable in the Y axis direction, and is disposed on the outer periphery side of the straight-movement frame 80. More specifically, as shown in FIG. 7, the third lens frame 92 mainly includes a base frame 95, a yawing movement frame 96, and a pitching movement frame 97 supporting the third lens group G3. The base frame 95 includes a base frame body 95a and three cam pins 95b disposed on the outer periphery side of the base frame body 95a. The cam pins 95b pass through the straight-movement grooves 82 of the straight-movement frame 80, and are inserted in the third cam grooves 74 of the rotation cam frame 70.

The yawing movement frame 96 is supported to be movable in the yawing direction (X axis direction) by the base frame 95. The pitching movement frame 97 is supported to be movable in the pitching direction (Z axis direction) by the yawing movement frame 96. This allows the third lens group G3 to move relative to the optical axis A in a plane perpendicular to the optical axis A.

An electric substrate 98 is fixed to the pitching movement frame 97. Two coils 98a and 98b are disposed on the electric substrate 98 to generate drive force in the pitching and the yawing direction. Two magnets 95c and 95d are fixed to the base frame 95. The coil 98a is disposed opposite to the magnet 95c in the Y axis direction. The coil 98b is disposed opposite to the magnet 95d in the Y axis direction. An L-shape yoke 99 is disposed on the positive side in the Y axis direction of the electric substrate 98. The L-shape yoke 99 is fixed to the base frame 95 such that coils 98a and 98b are disposed via gaps between the magnet 95c and the yoke 99, and between the magnet 95d and yoke 99.

These configurations allows to correct the image blur caused by a movement of the digital camera 1.

3.9.1. Configuration Around the Third Lens Group G3

Figure 16:
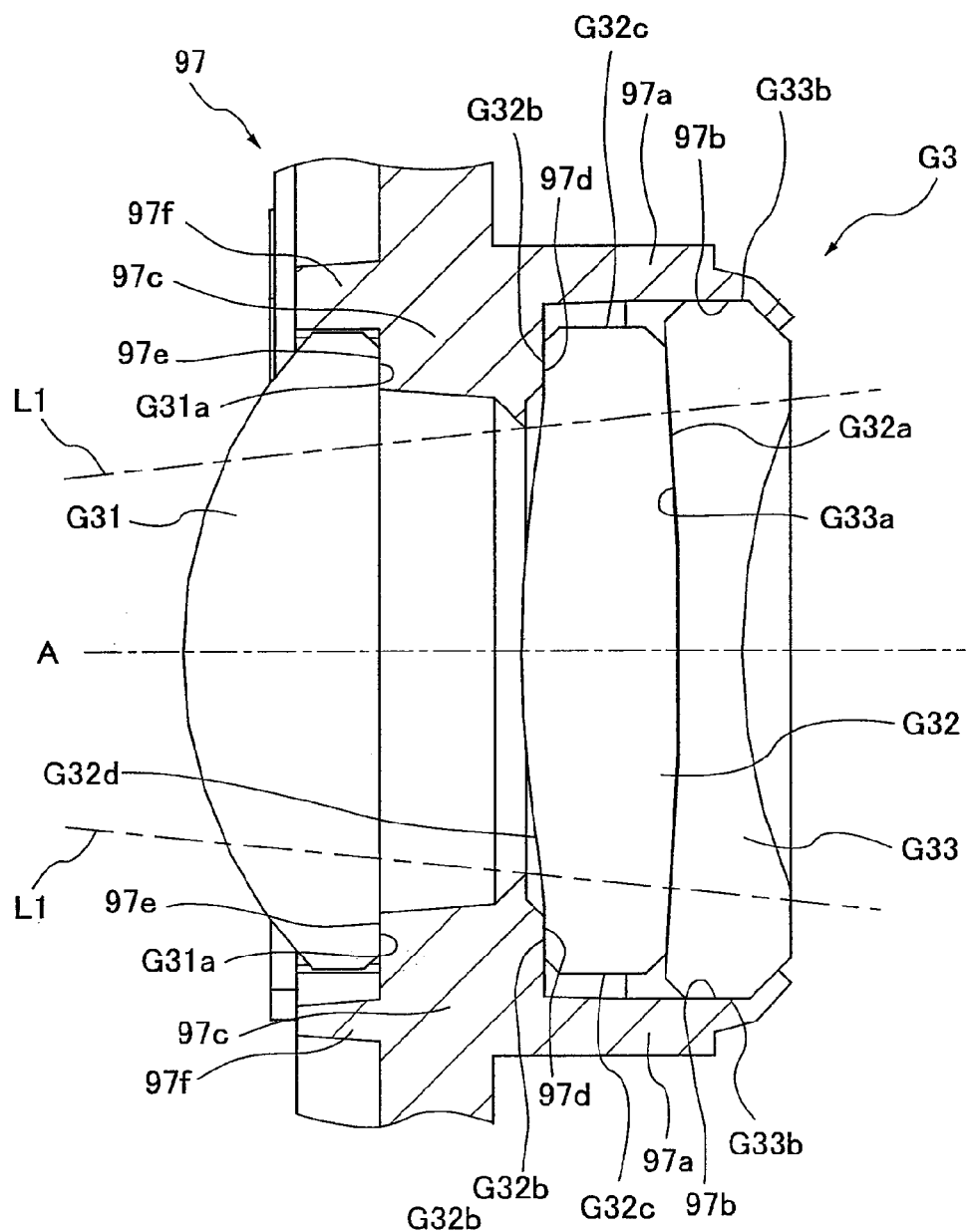
FIG. 16 is a general sectional view of an area around a third lens group.

In addition, the third lens group G3 is characterized in the structure retaining the lens. FIG. 16 is a general sectional view of the area around the third lens group G3. As shown in FIG. 16, the third lens group G3 includes a first lens G31 (adjustment lens), a second lens G32 (first lens), and a third lens G33 (second lens). The first lens G31 is a plane-convex lens, and takes in the light from the second lens group G2. The second lens G32 is a biconvex lens, and the surface 32d disposed on the positive side in the Y axis direction has an aspherical shape. A flat portion G32b having a flat surface perpendicular to the optical axis A is formed on the outer periphery side of the surface 32d. The third lens G33 is a biconcave lens. The second lens G32 is joined to the third lens G33. The outer diameter of the third lens G33 is greater than the outer diameter of the second lens G32.

The pitching movement frame 97 has a cylindrical portion 97a (second portion), a circular contact portion 97c, and three stationary portions 97f (third portions). The cylindrical portion 97a extends to the negative side in the Y axis direction The circular contact portion 97c extends to the inner side in the radial direction from the cylindrical portion 97a. The three stationary portions 97f protrude to the positive side in the Y axis direction from the contact portion 97c. The first lens G31 is disposed on the positive side of the contact portion 97c in the Y axis direction, and the second lens G32 and the third lens G33 are disposed on the inner periphery side of the cylindrical portion 97a and on the negative side in the Y axis direction of the contact portion 97c. The third lens G33 fits on the inner periphery side of the cylindrical portion 97a. More specifically, the outer circumferential surface G33b of the third lens G33 is in contact with the inner periphery surface 97b of the cylindrical portion 97a in the radial direction. The third lens G33 is positioned by the cylindrical portion 97a in the radial direction. For example, an end portion, which is caulked by heating, of the cylindrical portion 97a prevents the third lens G33 from moving to the positive side in the Y axis direction.

In addition, a lens surface G32a on the negative side in the Y axis direction of the second lens G32 is in contact with the lens surface G33a on the positive side of the third lens G33 in the Y axis direction, and is fixed by an adhesive, for example. The circular flat portion G32b formed on the second lens G32 is in contact with a circular second contact surface 97d formed on the contact portion 97c in the Y axis direction. The second lens G32 and the third lens G33 are positioned in the Y axis direction by the contact portion 97c. The second lens G32 is positioned in the radial direction by the cylindrical portion 97a via the second lens G32. In addition, the diameters of the second lens G32 and the third lens G33 are set to be larger, so that the optical valid regions of the second lens G32 and the third lens G33 spread out to the outer periphery side compared to a reflection prohibition line L1 of the light.

A contact surface G31a of the first lens G31 has a substantially circular flat shape, and is in contact with a circular first contact surface 97e formed on the contact portion 97c. The first lens G31 is fixed with an adhesive on the pitching movement frame 97, for example. The first lens G31 is disposed on the inner periphery side of the three stationary portions 97f, and is fixed to the stationary portions 97f with an adhesive. Gaps are secured between the first lens G31 and the stationary portions 97f in the radial direction. As a result, the first lens G31 can be fixed to the pitching movement frame 97 with an adhesive, after the position thereof in the direction perpendicular to the optical axis A is adjusted.

As described above, the first lens G31, the second lens G32, and the third lens G33 are positioned in the Y axis direction by the contact portion 97c. Therefore, the positioning accuracy of the second lens G32 and the third lens G33 in the Y axis direction relative to the first lens G31, and the positioning accuracy related to the inclination of the first lens G31 and the second lens G32 are only affected by the dimensional accuracy of the contact portion 97c. As a result, the positioning accuracy between the lenses in this lens barrel 3 is improved compared to a configuration in which the lenses are separately positioned with respect to a supporting frame.

In addition, since the second lens G32 and the third lens G33 are joined together, the distance between the lenses can be reduced, and the dimension of the third lens group G3 in the Y axis direction can be reduced. This allows the dimension of the lens barrel 3 in the Y axis direction to reduce.

In addition, since the second lens G32 and the third lens G33 are cemented together and positioned in the direction perpendicular to the optical axis A (X axis direction and Z axis direction) by the outer circumferential surface G33b of the third lens G33, each lens can be fixed to the pitching movement frame 97 without enlarging the diameter of the cylindrical portion 97a.

In addition, eccentricity of the second lens G32 and the third lens G33 may occur when the second lens G32 and the third lens G33 are cemented together. However, with this lens barrel 3, since the flat portion G32b of the second lens G32 and the contact portion 97c are in contact with each other, the second lens G32 only moves in the direction perpendicular to the optical axis A. In other words, the optical performance of the third lens group G3 can be prevented from deteriorating by correcting the eccentricity of this second lens G32 in some way.

Furthermore, with this lens barrel 3, the position of the first lens G31 can be adjusted in the direction perpendicular to the optical axis A. As a result, the eccentricity of the second lens G32 and the third lens G33 can be corrected by the positional adjustment of the first lens G31 in the direction perpendicular to the optical axis A, and this allows the optical deterioration of the third lens group G3 to be easily correct.

3.10. Fourth Lens Frame

As shown in FIG. 7, the fourth lens frame 93 is a member to support the fourth lens group G4 to be movable in the Y axis direction, and is movably supported in the Y axis direction by three shafts 14a, 14b, and 14c formed on the master flange 10. A part of the lens of the fourth lens group G4 is fixed to the master flange 10. The fourth lens frame 93 is driven by a focus motor 12 (refer to FIG. 4) fixed on the master flange 10. The fourth lens frame 93 moves in the Y axis direction relative to the master flange 10 in response to the drive force generated by the focus motor 12. This makes it possible to adjust the focus in the imaging optical system O.

3.11. Shutter Unit

The shutter unit 94 is a mechanism for adjusting the exposure state, and is disposed between the second lens frame 91 and the fourth lens frame 93. The shutter unit 94 is fixed to the base frame 95 of the third lens frame 92, and is movable in the Y axis direction relative to the stationary frame 20 with the third lens frame 92.

4. Operation of the Digital Camera

The operation of the digital camera 1 will be described with reference to FIGS. 1 to 3.

4.1. State when the Power is OFF

When the power switch 6 is OFF, the lens barrel 3 is in the retracted state (state in which the dimension of the lens barrel 3 in the Y axis direction is the shortest as shown in FIG. 8), so that the lens barrel 3 is accommodated within the outside dimension of the outer case 2 in the Y axis direction.

Figure 17A:
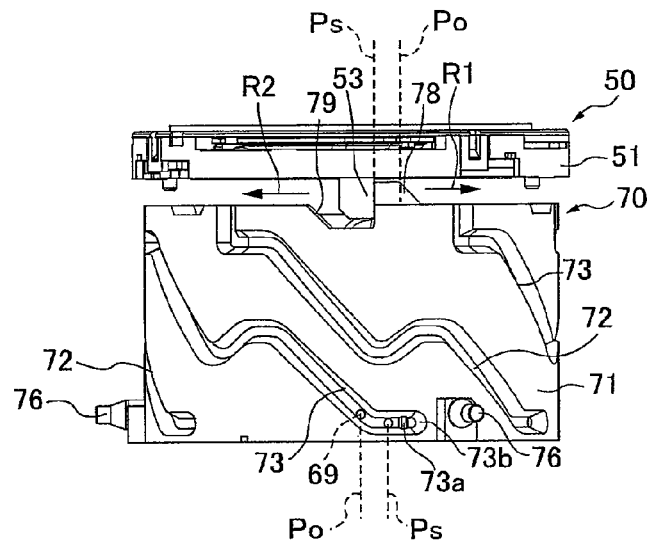
FIGS. 17A, 17B, and 17C are diagrams for describing the operation of the lens barrier and the rotation cam frame.

In this state, the lens barrier 50 of the lens barrel 3 is in the closed state. More specifically, as shown in FIG. 17A, the operating lever 53 of the lens barrier 50 is pressed to the rotational direction R2 side by the drive lever 78 of the rotation cam frame 70. Consequently, the barrier blades 52 of the lens barrier 50 are held in the closed state.

4.2. Operation when the Power is ON 4.2.1. Operation of the Lens Barrel

When the power switch 6 is turned on, power source is supplied to each unit, and the lens barrel 3 is driven to the photographing state from the retracted state. More specifically, the drive frame 30 is driven in the R1 direction by a predetermined angle relative to the stationary frame 20 by the zoom motor 11. As a result, the drive frame 30 moves to the positive side in the Y axis direction relative to the stationary frame 20 along the sloped grooves 23 while rotating relative to the stationary frame 20.

When the drive frame 30 moves in the Y axis direction while rotating relative to the stationary frame 20, the camera cam frame 40 moves in the Y axis direction together with the drive frame 30 via the first rotation protrusions 43, the second rotation protrusions 44, and the third rotation protrusions 45. At this time, the straight-movement pins 46 of the camera cam frame 40 are guided in the Y axis direction by the straight-movement grooves 27 of the stationary frame 20. Therefore, the camera cam frame 40 moves in the Y axis direction without rotating (in other words, while rotating relative to the drive frame 30) relative to the stationary frame 20.

In addition, the ends of the cam pins 76 of the rotation cam frame 70 are inserted in the straight-movement grooves 38 of the drive frame 30, and the rotation cam frame 70 rotates relative to the stationary frame 20 with the drive frame 30. As a result, the rotation cam frame 70 and the camera cam frame 40 relatively rotate. Since the cam pins 76 of the rotation cam frame 70 pass through the penetration cam grooves 42 of the camera cam frame 40, the rotation cam frame 70 moves to the Y axis direction while rotating relative to the camera cam frame 40 and the stationary frame 20 in accordance with the shape of the penetration cam grooves 42.

Here, the operation of the rotation cam frame 70 will be described in detail. As shown in FIG. 11A, the cam pins 76 of the rotation cam frame 70 move, for example, to the wide angle position P2 from the retracted position P1 along the penetration cam grooves 42. At this time, since the position in the Y axis direction practically does not change in the retracted position P1 and the wide angle position P2, the rotation cam frame 70 moves in the Y axis direction relative to the stationary frame 20, but practically does not move in the Y axis direction relative to the drive frame 30. In other words, during the retraction operation, the rotation cam frame 70 moves to the Y axis direction relative to the stationary frame 20 with the drive frame 30. In this embodiment, although the wide angle position P2 is the set position of the digital camera 1 at the time of actuation thereof, the set position may be some other positions (for example, position disposed between the wide angle position P2 and the telephoto position P3).

When the rotation cam frame 70 moves in the Y axis direction relative to the stationary frame 20 while rotating relative thereto, the first lens frame 60 moves in the Y axis direction in accordance with the movement of the rotation cam frame 70. More specifically, the second straight-movement pins 64 of the first lens frame 60 moves in the Y axis direction along the first straight-movement grooves 47 of the camera cam frame 40. This allows the first lens frame 60 to move in the Y axis direction relative to the camera cam frame 40 and the stationary frame 20 without rotating relative thereto (in other words, while rotating relative to the drive frame 30 and the rotation cam frame 70). At this time, the first straight-movement pins 63 move inside the second straight-movement grooves 48 without being in contact with the second straight-movement grooves 48.

When the rotation cam frame 70 rotates relative to the stationary frame 20, the first cam pins 68 move along the first cam grooves 72 of the rotation cam frame 70. Therefore, the first lens frame 60 moves in the Y axis direction while rotating relative to the rotation cam frame 70, in accordance with the shape of the first cam grooves 72. At this time, the second cam pins 69 move in the second cam grooves 73 without being in contact with the second cam grooves 73.

In addition, the cam pins 91b of the second lens frame 91 are inserted in the third cam grooves 74 of the rotation cam frame 70 in the state that the cam pins 91b pass through the straight-movement grooves 82 of the straight-movement frame 80. The cam pins 95b of the third lens frame 92 inserted in the fourth cam grooves 75 of the rotation cam frame 70 in the state that the cam pins 95b pass through the straight-movement grooves 82 of the straight-movement frame 80. Since the straight-movement pins 84 of the straight-movement frame 80 inserted in the third straight-movement grooves 49 of the camera cam frame 40, the straight-movement frame 80 is movable in the Y axis direction relative to the camera cam frame 40 and the stationary frame 20 without rotating relative thereto. These configurations prevents the second lens frame 91 and the third lens frame 92 from rotating relative to the straight-movement frame 80, the camera cam frame 40, and the stationary frame 20. In other words, the second lens frame 91 and the third lens frame 92 rotate relative to the rotation cam frame 70. This relative rotation results the second lens frame 91 to move in the Y axis direction in accordance with the shape of the third cam grooves 74, and results the third lens frame 92 to move in the Y axis direction in accordance with the shape of the fourth cam grooves 75.

As described above, when a drive force is inputted to the drive frame 30 during the retraction operation, the drive frame 30 moves in the Y axis direction relative to the stationary frame 20, which leads each member supported by the drive frame 30 to move in the Y axis direction relative to the stationary frame 20. When the drive frame 30 rotates only a predetermined angle, the rotation of the drive frame 30 stops, and the first lens frame 60, the second lens frame 91, and the third lens frame 92 stop at the wide angle end. By the above operation, the lens barrel 3 is in the photographing state (for example, the state shown in FIG. 9), and it becomes possible to photograph using the digital camera 1.

4.2.2. Operation of the Lens Barrier

Figure 17B:
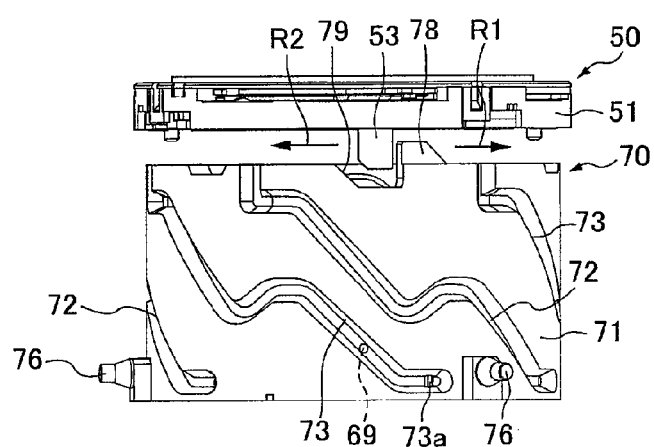
Figure 17C:
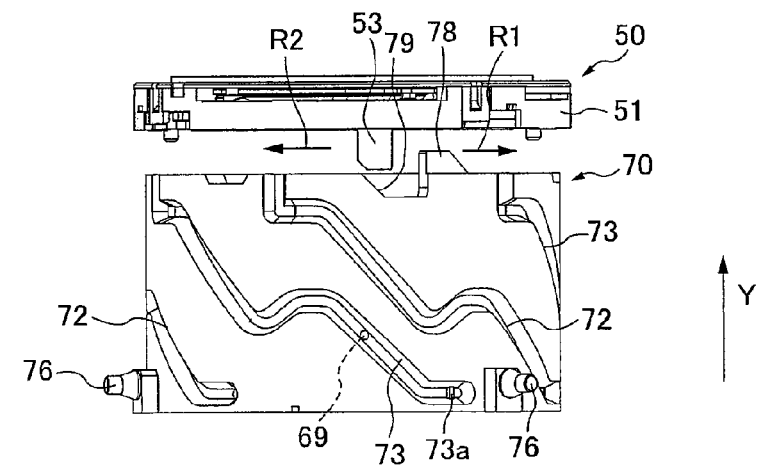

Here, the operation of the lens barrier 50 will be described. The above mentioned advancing operation of the lens barrel 3 when power-on leads the lens barrier 50 to change from the closed state to the opened state. More specifically, as described above, the rotation cam frame 70 rotates to the rotation direction R1 side relative to the first lens frame 60 during the advancing operation. As a result, the lens barrier 50 and the rotation cam frame 70 enter the state shown in FIG. 17C after the state shown in FIG. 17B. More specifically, as shown in FIG. 17C, the pressing force applied by the drive lever 78 to the operating lever 53 is released, and the operating lever 53 moves from the closed position Ps to the opened position Po.

At this time, as shown in FIG. 17, the second cam pins 69 of the first lens frame 60 move in the rotational direction in the second cam grooves 73 from an area around the step portions 73a, and are guided by the sloped portions of the second cam grooves 73, for example. Therefore, the drive lever 78 moves to the negative side in the Y axis direction while rotating, after moving to the rotational direction R1 side relative to the operating lever 53.

The above operation results the lens barrier 50 to enter the opened state, and light is taken from outside into the first lens group G1.

5.3. Zoom Operation during Photographing 5.3.1. Operation at the Telephoto Side

When the zoom adjustment lever 7 is operated on the telephoto side, the drive frame 30 is driven in the R1 direction relative to the stationary frame 20 by the zoom motor 11, according to the rotational angle and the operation duration of the zoom adjustment lever 7.

As a result, the rotation cam frame 70 moves to the positive side in the Y axis direction relative to the drive frame 30 while rotating relative thereto, along with the drive frame 30. At this time, the drive frame 30 rotates relative to the stationary frame 20, but does not move relative thereto in the Y axis direction.

In addition, the first lens frame 60 mainly moves to the positive side in the Y axis direction relative to the rotation cam frame 70, while rotating relative thereto (without rotating relative to the stationary frame 20). On the other hand, the second lens frame 91 mainly moves to the negative side in the Y axis direction relative to the rotation cam frame 70, while rotating relative thereto (without rotating relative to the stationary frame 20). These operations lead the zoom magnification of the imaging optical system O to become gradually higher. When the lens barrel 3 reaches the telephoto end, the lens barrel 3 is stopped in the state shown in FIG. 10.

5.3.2. Operation at the Wide Angle Side

When the zoom adjustment lever 7 is operated on the wide angle side, the drive frame 30 is driven in the R2 direction relative to the stationary frame 20 by the zoom motor 11, according to the rotational angle and the operation duration of the zoom adjustment lever 7. As a result, the rotation cam frame 70 moves to the negative side in the Y axis direction relative to the drive frame 30 while rotating relative thereto, along with the drive frame 30. At this time, the drive frame 30 rotates relative to the stationary frame 20, but does not move relative thereto in the Y axis direction.

In addition, the first lens frame 60 mainly moves to the negative side in the Y axis direction relative to the rotation cam frame 70 while rotating relative thereto (without rotating relative to the stationary frame 20). On the other hand, the second lens frame 91 mainly moves to the positive side in the Y axis direction relative to the rotation cam frame 70 while rotating relative thereto (without rotating relative to the stationary frame 20). These operations lead the zoom magnification of the imaging optical system O to become gradually lower. When the lens barrel 3 reaches the telephoto end, the lens barrel 3 is stopped in the state shown in FIG. 9.

6. Characteristics

The characteristics of the digital camera 1 and the lens barrel 3 are described below.

6.1.

With this lens barrel 3, in the case that the stationary frame 20 is taken as the standard, the first lens frame 60 moves to the Y axis direction relative to the stationary frame 20 via the drive frame 30 and the rotation cam frame 70. Therefore, the displacement to the Y axis direction of the first lens frame 60 is the summation of the displacement of the drive frame to the Y axis direction relative to the stationary frame, the displacement of the rotation cam frame 70 to the Y axis direction relative to the drive frame, and the displacement of the first lens frame to the Y axis direction relative to the rotation cam frame 70. In other words, with this lens barrel 3, members that move the first lens frame 60 to the Y axis direction are more compared to a conventional lens barrel, by just the rotation cam frame 70. As a result, the displacement of the first lens frame 60 can be shared with the drive frame 30 and the rotation cam frame 70, and this allows the dimensions of the stationary frame 20, the drive frame 30, and the rotation cam frame 70 in Y axis direction to be reduced. Consequently, this makes it possible to reduce dimension in the Y axis direction in the state that the lens barrel 3 is retracted the most, and miniaturization of the lens barrel 3 can be realized.

6.2.

With this lens barrel 3, since the rotation cam frame 70 rotates integrally with the drive frame 30, the relative rotation of rotation cam frame 70 and the first lens frame can be realized, without rotating the first lens frame 60 relative to the stationary frame 20. As a result, with this lens barrel 3, it is possible to realize miniaturization while stabilizing the optical performance.

6.3.

With this lens barrel 3, since the first lens frame 60 is disposed on the outer periphery side of the rotation cam frame 70, it is possible to enlarge the diameter of the first lens frame 60, compared to the case that the first lens frame 60 is disposed on the inner periphery side of the rotation cam frame 70. As a result, the design freedom of the imaging optical system O improves.

In addition, although the stationary frame 20, the drive frame 30, and the first lens frame 60 are exposed to the outside, the rotation cam frame 70 is not exposed outside. Therefore, compared to the case that the first lens frame 60 is disposed on the inner periphery side of the rotation cam frame 70, the number of gaps that expose to the outside reduces, which prevents the optical performance of the lens barrel 3 from deteriorating.

6.4.

With this lens barrel 3, when the drive frame 30 rotates relative to the stationary frame 20, the drive frame 30 and the rotation cam frame 70 rotate integrally, and the rotation cam frame 70 and the second cam frame relatively rotate. Therefore, the rotation cam frame 70 moves to the Y axis direction without rotating relative to the drive frame 30, in accordance with the shape of the penetration cam grooves 42. As a result, it is possible to realize the mechanism that moves the rotation cam frame 70 to the Y axis direction relative to the drive frame 30 with a simple structure, 6.5.

With this lens barrel 3, since the lens barrier 50 is movable in the Y axis direction and rotatable around the optical axis relative to the rotation cam frame 70, the operating lever 53 of the lens barrier 50 can be pressed in the rotational direction by the drive lever 78 of the rotation cam frame 70.

In this way, since the operating lever 78 is driven using the rotation cam frame 70, which is not a motionless member but one of the supporting frames, the operating lever 53 of the lens barrier 50 and the drive lever 78 of the rotation cam frame 70 can be easily disposed close to each other, and other supporting frames disposed close to the first lens frame 60 and the rotation cam frame 70 become hard to be subjected to the design limitation caused by the operating lever 53 and the drive lever 78. That is, the miniaturization of the lens barrel 3 can be realized.

In addition, the operation until the drive lever 78 contacts the operating lever 53, or the operation in which the drive lever 78 presses the operating lever 53, is realized using the sloped portions of the first cam grooves 72 and the second cam grooves 73. Therefore, the portions included in the first cam grooves 72 and the second cam grooves 73 and extending in the rotational direction become shorter, and the angles of the sloped portions of the first cam grooves 72 and the second cam grooves 73 become gentler with respect to the rotational direction. As a result, the pressure angle between the first cam grooves 72 and the second cam grooves 73 can be reduced, and the drive of the lens barrel 3 becomes smoother.

6.6.

With this lens barrel 3, the rotation cam frame 70 has a recess 79 that is formed on the cam frame body 71, in which the operating lever 53 is accommodated in the direction along the optical axis. Therefore, even if the operating lever 53 comes close to the rotation cam frame 70, the operating lever 53 is accommodated in the recess 79 of the rotation cam frame 70. As a result, it is possible to reduce the dimension of the lens barrel 3 in the Y axis direction, in a state in which the rotation cam frame 70 and the first lens frame 60 are retracted the most in the Y axis direction. As a result, the miniaturization of the lens barrel 3 can be realized.

6.7.

With this lens barrel 3, the lock mechanism is realized by the step portions 73a formed in the second cam grooves 73 and the second cam pins 69. Therefore, when the lens barrier 50, the first lens frame 60, and the rotation cam frame 70 are attached, in the state in which the drive lever 78 is pressed against the operating lever 53, the lens barrier 50, the first lens frame 60, and the rotation cam frame 70 are treated as one assembly. As a result, the assembly performance of the lens barrel 3 improves, and the manufacturing cost can be reduced.

In addition, although the first cam pins 68 are used for positioning, the second cam pins 69 are used for strengthening. In other words, the lock mechanism is realized by the second cam pins 69 used for strengthening, and the first cam pins 68 are not used for the lock mechanism. Therefore, the first cam pins 68 are prevented from being worn out due to the lock mechanism, and the lock mechanism can be realized without deteriorating the positioning accuracy by the first cam pins 68.

6.8.

With this lens barrel 3, since the first cam pins 68 and the second cam pins 69 of the first lens frame 60 are disposed on the opposite side from the first straight-movement pins 63 and the second straight-movement pins 64 in the radial direction, the thicker portions to fix the first cam pins 68 and the second cam pins 69 can be used as the first straight-movement pins 63 and the second straight-movement pins 64.

In this case, since the first straight-movement pins 63 and the second straight-movement pins 64 are inserted in the first straight-movement grooves 47 and the second straight-movement grooves 48 of the camera cam frame 40, the inner diameter of the camera cam frame 40 disposed on the outer periphery side of the first lens frame body 61 is not necessary to become larger in order to provide the first straight-movement pins 63 and the second straight-movement pins 64, and the first straight-movement pins 63 and the second straight-movement pins 64 are not affected by the outside dimension of the first lens frame body 61. As a result, with this lens barrel 3, it is possible to miniaturize in the radial direction.

In addition, support frames such as the first lens frame 60 are generally manufactured by injection molding, for example. In this case, since the first cam pins 68 and the second cam pins 69 are separate members from the first lens frame body 61, it becomes easier to remove the molded products from the mold during injection molding, which improves the productivity.

6.9.

With this lens barrel 3, since the first straight-movement pins 63 and the second straight-movement pins 64 are disposed at an irregular pitch in the circumferential direction, the first lens frame 60 and the rotation cam frame 70 are prevented from being attached in the wrong direction when the first lens frame 60 is attached to the rotation cam frame 70, which improves the assembly performance of the lens barrel 3.

In addition, with the lens barrel 3, since the first cam pins 68 and the second cam pins 69 are disposed at an irregular pitch in the circumferential direction, the first lens frame 60 is prevented from being attached in the wrong direction when the first lens frame 60 is attached to the camera cam frame 40, which improves the assembly performance of the lens barrel 3.

According to the above, the manufacturing cost of this lens barrel 3 can be realized.

6.10.

With this lens barrel 3, since the second cam pins 69 are disposed on the outer periphery side in the radial direction compared to the first cam pins 68, the depth in which the second cam pins 69 are inserted can be shallower than that of the first cam pins 68 while the first cam pins 68 and the second cam pins 69 have the same shapes. As a result, the first cam pins 68 can be mainly used for positioning, and the second cam pins 69 can be mainly used for strengthening.

In other words, with this lens barrel 3, in addition to the three first cam pins 68 used for positioning, three second cam pins 69 are provided for strengthening. Consequently, the impact applied when the digital camera 1 is dropped can be dispersed to the first cam pins 68 and the second cam pins 69, and the first cam pins 68 and the second cam pins 69 are prevented from being damaged. That is, this structure allows the strength of the lens barrel 3 to be improved.

6.11.

With this lens barrel 3, the penetration cam grooves 42 are disposed between the first rotation protrusions 43 and the second rotation protrusions 44 in the Y axis direction. The wide angle position P2 of the penetration cam grooves 42 is located between the second rotation protrusions 44 and the third rotation protrusions 45 in the circumferential direction. In this way, the first rotation protrusions 43, the second rotation protrusions 44, and the third rotation protrusions 45 are disposed around the penetration cam grooves 42. In other words, thicker portions exist around the penetration cam grooves 42. As a result, the strength around the penetration cam grooves 42 of the camera cam frame 40 increases, which improves the strength of the lens barrel 3.

In particular, since the penetration cam grooves 42 are disposed on the negative side in the Y axis direction in the camera cam frame 40, the strength of a portion 41a (refer to FIG. 11) formed on the negative side of the penetration cam grooves 42 in the Y axis direction tends to decrease. However, since the second rotation protrusions 44 and the third rotation protrusions 45 are disposed on the negative side of the penetration cam grooves 42 in the Y axis direction, the strength of the portion 41a can be increased.

With this lens barrel 3, the second rotation protrusions 44 are disposed in the photographing regions 42q, and the third rotation protrusions 45 are disposed in the retracting regions 42p of the penetration cam grooves 42. Therefore, the photographing regions 42q and the retracting regions 42p can be strengthened by the second rotation protrusions 44 and the third rotation protrusions 45.

Also, with the lens barrel 3, since the second rotation protrusions 44 are disposed close to the wide angle position P2 (actuation position) of the penetration cam grooves 42, the strength of the camera cam frame 40 around the wide angle position P2, at which users are likely to drop the digital camera 1, can be increased, which prevents the lens barrel 3 from being damaged.

In addition, with this lens barrel 3, since the portion of the second rotation protrusions 44 and the portion of the third rotation protrusions 45 are accommodated in curved portions of the penetration cam grooves 42 in the Y axis direction, the strength of the camera cam frame 40 can be increased while reducing the dimension of the camera cam frame 40 in the Y axis direction.

Furthermore, with this lens barrel 3, since the second rotation protrusions 44 and the third rotation protrusions 45 are disposed at the same position in the Y axis direction, the second rotation protrusions 44 and the third rotation protrusions 45 can be inserted in one second rotation groove 37. As a result, it is not necessary to form a plurality of rotation grooves in the drive frame 30, and the strength of the lens barrel 3 can be increased with the simple structure.

6.12.

With this lens barrel 3, the first lens G31 is positioned by the second lens G32 in the direction perpendicular to the optical axis A, and the second lens G32 in the direction perpendicular to the optical axis A is positioned by the first lens G31 in the direction perpendicular to the optical axis A. Therefore, in the state in which the first lens G31 and the second lens G32 are joined, the distance between the first lens G31 and the second lens G32 can be decreased, and this allows the lens barrel 3 to be miniaturized.

In addition, the first lens G31, since the second lens G32, and the third lens G33 are positioned by the contact portion 97c in the Y axis direction, the positioning accuracy of the second lens G32 and the third lens G33 in the Y axis direction with respect to the first lens G31, and the positioning accuracy related to the inclination of the first lens G31 and the second lens G32 are only affected by the dimensional precision of the contact portion 97c. As a result, since the positioning accuracy of the first lens G31 to the third lens G33 enhances, the optical performance can be improved.

In addition, since the second lens G32 and the third lens G33 are cemented together and positioned in the direction perpendicular to the optical axis A (X axis direction and Z axis direction) by the outer circumferential surface G33b of the third lens G33, each lens can be fixed to the pitching movement frame 97 without enlarging the diameter of the cylindrical portion 97a. Therefore, the miniaturization of the lens barrel 3 can be realized.

In addition, since the flat portion G32b of the second lens G32 and the contact portion 97c are in contact with each other, even in the case that the center position of the second lens G32 and the third lens G33 are off centered, the optical deterioration of the third lens group G3 can be corrected by adjusting the position of the first lens G31 in the direction perpendicular to the optical axis A.

6.13.

As described above, with this digital camera 1, since the lens barrel 3 is equipped therein, the miniaturization, the reduction of the manufacturing cost, or the improvement of the strength can be realized.

7. Other Embodiments

The supporting frames, lens barrel, and the camera of the present invention are not limited to those described in the embodiment above, and various changes and modifications can be made herein within the range not departing from the gist of the invention.

7.1.

The arrangement of the second rotation protrusions 44 and the third rotation protrusions 45 of the camera cam frame 40 is not limited to that of the above embodiment. For example, in the case that the strengthening of the camera cam frame 40 is accorded priority over miniaturization, the second rotation protrusions 44 may be disposed on the negative side in the Y axis direction of the wide angle position P2 of the penetration cam grooves 42. In this case, although the dimension of the camera cam frame 40 in the Y axis direction becomes larger, the strength around the wide angle position P2 of the camera cam frame 40 further increases.

7.2.

In the above embodiment, although the first cam pins 68 and the second cam pins 69 are separate members from the first lens frame body 61, the first cam pins 68 and the second cam pins 69 may be formed integrally with the first lens frame body 61.

7.3.

In the above embodiment, although a digital still camera as a device in which the lens barrel 3 is equipped is described as an example, the device in which the lens barrel 3 is equipped is not limited to that in the embodiment described above, and it may be a digital video camera that mainly takes moving pictures, for example.

GENERAL INTERPRETATION OF TERMS

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "approximately", "about" and "substantially" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel that supports an imaging optical system, the lens barrel comprising:
a stationary frame;
a drive frame supported by the stationary frame to be rotatable around an optical axis of the imaging optical system and movable in a straight-movement direction along the optical axis in response to a drive force inputted in the rotational direction around the optical axis;
a first cam frame supported by the drive frame to be movable in the straight-movement direction relative to the drive frame in response to the drive force; and
a first lens frame supporting a first lens group included in the imaging optical system, and supported by the first cam frame to be movable in the straight-movement direction relative to the first cam frame in response to the drive force.

2. The lens barrel according to claim 1, wherein
the first cam frame is supported by the drive frame to be movable in the straight-movement direction and rotatable integrally around the optical axis relative to the drive frame in response to the drive force.

3. The lens barrel according to claim 1, wherein
the first cam frame is disposed on the inner periphery side of the drive frame, and
the first lens frame is disposed on the outer periphery side of the first cam frame and on the inner periphery side of the drive frame.

4. The lens barrel according to claim 1, further comprising a second cam frame supported by the stationary frame to be movable around the optical axis relative to the stationary frame,
wherein, the first cam frame includes a plurality of cam pins, and
the second cam frame includes a plurality of penetration cam grooves with which the cam pins engage.

5. The lens barrel according to claim 1, further comprising a second cam frame supported by the stationary frame to be nonrotatable around the optical axis relative to the stationary frame,
wherein, the first cam frame includes a plurality of cam pins on the outer periphery side thereof,
the drive frame includes a plurality of straight-movement grooves extending in the straight-movement direction and guiding the cam pins, and
the second cam frame includes a plurality of penetration cam grooves through which the cam pins pass.

6. The lens barrel according to claim 1, further comprising a second lens frame supported by the first cam frame to be movable in the straight-movement direction relative to the first cam frame in response to the drive force, and supporting a second lens group included in the imaging optical system,
wherein, the second lens frame is disposed on the inner periphery side of the first cam frame.

7. The lens barrel according to claim 6, further comprising a third lens frame supported by the first cam frame to be movable in the straight-movement direction relative to the first cam frame in response to the drive force, and supporting a third lens group included in the imaging optical system,
wherein, the third lens frame is disposed on the inner periphery side of the first cam frame, and
the second lens frame is disposed between the first lens frame and third lens frame in the straight-movement direction.

8. A camera, comprising:
the lens barrel according to claim 1;
an imaging optical system supported by the lens barrel;
an image capturing unit that captures an optical image of a subject formed by the imaging optical system; and
an outer case supporting the lens barrel.

* * * * *